(12) United States Patent
Tomeba et al.

(10) Patent No.: US 11,304,065 B2
(45) Date of Patent: Apr. 12, 2022

(54) BASE STATION APPARATUS, TERMINAL APPARATUS, AND COMMUNICATION METHOD

(71) Applicants: SHARP KABUSHIKI KAISHA, Sakai (JP); FG INNOVATION COMPANY LIMITED, Tuen Mun (HK)

(72) Inventors: Hiromichi Tomeba, Sakai (JP); Ryota Yamada, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/313,428

(22) PCT Filed: Jun. 22, 2017

(86) PCT No.: PCT/JP2017/022964
§ 371 (c)(1),
(2) Date: Dec. 26, 2018

(87) PCT Pub. No.: WO2018/008405
PCT Pub. Date: Jan. 11, 2018

(65) Prior Publication Data
US 2019/0230521 A1 Jul. 25, 2019

(30) Foreign Application Priority Data
Jul. 5, 2016 (JP) .............................. JP2016-133249

(51) Int. Cl.
*H04W 16/28* (2009.01)
*H04B 7/06* (2006.01)
(Continued)

(52) U.S. Cl.
CPC .............. *H04W 16/28* (2013.01); *H04B 7/06* (2013.01); *H04W 72/0446* (2013.01); *H04W 88/02* (2013.01); *H04W 92/10* (2013.01)

(58) Field of Classification Search
CPC .... H04B 7/06; H04W 16/28; H04W 72/0446; H04W 88/02; H04W 92/10
See application file for complete search history.

(56) References Cited

U.S. PATENT DOCUMENTS

2009/0060081 A1* 3/2009 Zhang ............... H04W 72/0446
375/267
2009/0303944 A1* 12/2009 Fukuoka ........... H04W 72/0446
370/329

(Continued)

FOREIGN PATENT DOCUMENTS

WO WO-2014080744 A1 * 5/2014 .......... H04W 52/146

OTHER PUBLICATIONS

International Search Report for PCTJP2017022964; dated Dec. 12, 2017 (Year: 2017).*

(Continued)

*Primary Examiner* — Benjamin H Elliott, IV
(74) *Attorney, Agent, or Firm* — ScienBiziP, P.C.

(57) ABSTRACT

A base station apparatus, a terminal apparatus, and a communication method are provided that achieve a radio access network in which beam sweeping is appropriately performed in an environment in which a plurality of frame formats are used in a multiplexed fashion. The terminal apparatus according to the present invention includes an antenna unit configured to have a plurality of beam patterns configurable, a receiver configured to acquire information for indicating at (Continued)

least one of a plurality of frame configurations, and a beam sweeping unit configured to perform beam sweeping based on a prescribed frame configuration in a case that the information for indicating the one of the plurality of frame configurations indicates the prescribed frame configuration.

8 Claims, 11 Drawing Sheets

(51) Int. Cl.
*H04W 88/02* (2009.01)
*H04W 72/04* (2009.01)
*H04W 92/10* (2009.01)

(56) References Cited

U.S. PATENT DOCUMENTS

| | | | | |
|---|---|---|---|---|
| 2010/0046459 | A1* | 2/2010 | Nishio | H04B 7/12 370/329 |
| 2011/0116436 | A1* | 5/2011 | Bachu | H04L 5/0048 370/312 |
| 2012/0093119 | A1* | 4/2012 | Kim | H04L 27/2613 370/329 |
| 2013/0322369 | A1* | 12/2013 | Park | H04L 5/0053 370/329 |
| 2014/0241242 | A1 | 8/2014 | Josiam et al. | |
| 2015/0139119 | A1* | 5/2015 | Azizi | H04L 27/2601 370/329 |
| 2015/0264683 | A1* | 9/2015 | Kim | H04L 5/0007 370/329 |
| 2015/0304994 | A1* | 10/2015 | Kim | H04L 5/0048 370/280 |
| 2015/0341910 | A1* | 11/2015 | Hayashi | H04W 52/146 455/452.1 |
| 2017/0359791 | A1* | 12/2017 | Onggosanusi | H04L 5/0023 |
| 2017/0366311 | A1* | 12/2017 | Iyer | H04L 5/0007 |
| 2019/0075006 | A1* | 3/2019 | Yi | H04L 27/2602 |
| 2019/0081842 | A1* | 3/2019 | Kim | H04L 27/26025 |
| 2019/0230521 | A1* | 7/2019 | Tomeba | H04B 7/06 |
| 2020/0229180 | A1* | 7/2020 | Liu | H04W 72/0453 |
| 2020/0287684 | A1* | 9/2020 | Shin | H04L 5/0007 |

OTHER PUBLICATIONS

3GPP TS 36.211 V13.2.0 (Jun. 2016) Technical Specification 3rd Generation Partnership Project; Technical Specification Group Radio Access Network; (Year: 2016).*
3GPP TSG RAN WG1 Meeting #85 R1-164032 Nanjing, China, May 23-27, 2016; Huawei et al.; "Discussion on frame structure for NR" (Year: 2016).*
3GPP TSG-RAN WG1 Meeting #85 R1-164261 Nanjing, China, May 23-27, 2016; ZTE et al.; "Forward compatibilty for numerology and frame structure design" (Year: 2016).*
3GPP TSG RAN WG1 Meeting #85 R1-164445 Nanjing, China May 23-27, 2016; Qualcomm; "Support of Periodic and/or Aperiodic SRS" (Year: 2016).*
TSG-RAN WG1 #85 R1-164472 Nanjing, China, May 23-27, 2016; Guangdong OPPO Mobile Telecom; "Frame structure supporting flexible parameter allocations" (Year: 2016).*
3GPP TSG RAN WG1 Meeting #85 R1-164652 Nanjing, China, May 23-27, 2016; Lenovo; "Frame structure design for new radio interface" (Year: 2016).*
3GPP TSG-RAN WG1 #85 R1-164694 May 23-27, 2016 Nanjing, China; Qualcomm; "Frame structure requirements" (Year: 2016).*
3GPP TSG-RAN WG1#85 R1-165027 Nanjing, P.R. China May 23-27, 2016; Nokia et al.; "Basic frame structure principles for 5G" (Year: 2016).*
IMT Vision—Framework and overall objectives of the future development of IMT for 2020 and beyond, Recommendation ITU-R M.2083-0, Sep. 2015.
Samsung, "Random Access Procedure in NR", 3GPP TSG-RAN WG2 Meeting #94 R2-163372, Nanjing, China, May 23-27, 2016.
Nokia, Alcatel-Lucent Shanghai Bell, "Channel reciprocity support in NR", 3GPP TSG-RAN WG1 #85 R1-165366, Nanjing, P.R. China, May 23-27, 2016.
Huawei, Hisilicon, "Discussion on frame structure for NR", 3GPP TSG RAN WG1 Meeting #85 R1-164032, Nanjing, China, May 23-27, 2016.
Sony: "Enhanced multiple antenna transmission for NR", R1-164660, 3GPP TSG RAN WG1 #85, Nanjing,China, May 23-27, 2016.
ITL: "On Frame Structure for NR", R1-165242, 3GPP TSG RAN WG1 Meeting #85, Nanjing, China May 23-27, 2016.
Huawei et al., "Remaining details of uplink frame structure design", R1-161811 3GPP TSG RAN WG1 NB-IoT Ad-Hoc Meeting #2, Sophia-Antipolis, France, Mar. 22-24, 2016.

* cited by examiner

BASE STATION APPARATUS, TERMINAL APPARATUS, AND COMMUNICATION METHOD

TECHNICAL FIELD

The present invention relates to a base station apparatus, a terminal apparatus, and a communication method.

BACKGROUND ART

In a communication system such as Long Term Evolution (LTE) or LTE-Advanced (LTE-A) standardized by the Third Generation Partnership Project (3GPP), the communication area can be widened by taking a cellular configuration in which areas covered by base station apparatuses (base stations, transmission stations, transmission points, downlink transmission devices, uplink reception devices, a group of transmit antennas, a group of transmit antenna ports, component carriers, eNodeB) or transmission stations equivalent to the base station apparatuses are disposed in the form of multiple cells (Cells) being linked together. The base station apparatus is connected to a terminal apparatus (reception station, reception point, downlink reception apparatus, uplink transmission apparatus, reception antenna group, reception antenna port group, UE, station, STA). In such a cellular configuration, frequency efficiency can be improved by using the same frequency among neighboring cells or sectors.

In LTE/LTE-A, frame formats are defined for frequency division duplexing, time division duplexing, and license auxiliary access, respectively. For example, the base station apparatus and the terminal apparatus of LTE/LTE-A using frequency division duplex can always perform communication using a common frame format regardless of communication bandwidth or the like.

Research and development activities related to the 5th generation mobile radio communication system (5G system) are being actively carried out aiming to start commercial services around the year 2020. A vision recommendation on the standard system of the 5G system (International mobile telecommunication—2020 and beyond: IMT-2020) was recently reported (see NPL 1) by the International Telecommunication Union Radio Communication Sector (ITU-R), which is an international standardization body.

The 5G system envisages a radio access network operated by combining various frequency bands to satisfy various requirements represented by three large use scenarios (Enhanced mobile broadband (EMBB), Enhanced Massive machine type communication (eMTC), and Ultra-reliable and low latency communication (URLLC)). Therefore, in the 5G system, unlike in the conventional LTE/LTE-A, while based on the same access method, the use of different and multiplexed frame formats is considered.

At the same time, a frequency band expected to be utilized in the 5G system includes frequency bands which are in the over-6 GHz high frequency range. In the high frequency band, the degradation of the reception quality due to propagation loss becomes large to an extent that it cannot be ignored. Since there is a limit to increasing the transmission power, it is envisaged that beamforming using a plurality of antenna elements becomes essential in the high frequency band. Also, in beamforming, making the antenna pattern directional is not enough, and a beam sweeping for orienting the main beam of the antenna pattern in a desired direction becomes essential.

CITATION LIST

Non Patent Literature

NPL 1: "IMT Vision—Framework and overall objectives of the future development of IMT for 2020 and beyond," Recommendation ITU-R M. 2083-0, September 2015.

SUMMARY OF INVENTION

Technical Problem

However, in the 5G system in which it is assumed that a plurality of frame formats are multiplexed and used, since the symbol length varies from one frame format to another, there is a possibility that an accurate beam sweeping is not performed. This suggests that the communication capacity in the high frequency band is significantly degraded.

The present invention has been made in light of such circumstances, and an object thereof is to provide a base station apparatus, a terminal apparatus, and a communication method that achieve a radio access network in which beam sweeping is appropriately performed in an environment in which a plurality of frame formats are used in a multiplexed fashion.

Solution to Problem

To address the above-mentioned drawbacks, a base station apparatus, a terminal apparatus, and a communication method according to an aspect of the present invention are configured as follows.

(1) Namely, the terminal apparatus according to an aspect of the present invention includes an antenna unit configured to have a plurality of beam patterns configurable, a receiver configured to acquire information for indicating at least one of a plurality of frame configurations, and a beam sweeping unit configured to perform beam sweeping based on a prescribed frame configuration in a case that the information for indicating the one of the plurality of frame configurations indicates the prescribed frame configuration.

(2) In addition, the terminal apparatus according to an aspect of the invention is a terminal apparatus described in the above section (1), wherein the receiver acquires the information indicating the prescribed frame configuration from the base station apparatus.

(3) In addition, the terminal apparatus according to an aspect of the invention is a terminal apparatus described in the above section (1), wherein the beam sweeping unit is capable of performing the beam sweeping within a prescribed time period, and the beam sweeping unit determines the number of beam patterns to be scanned within the prescribed time period based on the one of the plurality of frame configurations.

(4) In addition, the terminal apparatus according to an aspect of the invention is a terminal apparatus described in the above section (3), wherein the plurality of frame configurations include a first frame configuration and a second frame configuration, each of which has a subcarrier interval different from each other, the subcarrier interval of the first frame configuration is larger than the subcarrier interval of the second frame configuration, and in a case that the information for indicating the one of the plurality of frame configurations indicates the first frame configuration, the beam sweeping unit scans, within the prescribed time period, the same or larger number of beam patterns compared to a case in which the information for indicating the one of the plurality of frame configurations indicates the second frame configuration.

(5) In addition, the base station apparatus according to an aspect of the invention is a base station apparatus for communicating with a terminal apparatus, the base station apparatus including, a receiver configured to receive a signal transmitted from the terminal apparatus, a frame configuration unit configured to configure a plurality of frame configurations, and a transmitter configured to notify information for indicating at least one of a plurality of frame configurations to the terminal apparatus, wherein a beam detection operation is performed in a case that the information for indicating the one of the plurality of frame configurations indicates a prescribed frame configuration.

(6) In addition, the base station apparatus according to an aspect of the invention is a base station apparatus described in the above section (5), wherein the transmitter notifies the information indicating the prescribed frame configuration to the terminal apparatus.

(7) In addition, the base station apparatus according to an aspect of the invention is a base station apparatus described in the above section (5), wherein the beam detection operation is performed for each of the plurality of frame configurations.

(8) In addition, the base station apparatus according to an aspect of the invention is a base station apparatus described in the above section (5), wherein the number of beam patterns to be scanned by the beam detection operation within a prescribed time period is determined based on the one of the plurality of frame configurations.

(9) In addition, the base station apparatus according to an aspect of the invention is a base station apparatus described in the above section (8), wherein the plurality of frame configurations include a first frame configuration and a second frame configuration, each of which has a subcarrier interval different from each other, the subcarrier interval of the first frame configuration is larger than the subcarrier interval of the second frame configuration, and in a case that the information for indicating the one of the plurality of frame configurations indicates the first frame configuration, the number of beam patterns to be scanned within the prescribed time period is the same or larger compared to a case in which the information for indicating the one of the plurality of frame configurations indicates the second frame configuration.

(10) In addition, the communication method according to an aspect of the invention is the communication method of a terminal apparatus for communicating with a base station apparatus, the communication method comprising the steps of, configuring a beam pattern from a plurality of beam patterns, acquiring information for indicating at least one of a plurality of frame configurations, and performing a beam sweeping based on a prescribed frame configuration in a case that the information for indicating the one of the plurality of frame configurations indicates the prescribed frame configuration.

Advantageous Effects of Invention

The present invention enables the communication quality of the communication system to be greatly improved, as a radio access network is achieved in which beam sweeping is appropriately performed in an environment where a plurality of frame formats are multiplexed and used.

DESCRIPTION OF EMBODIMENTS

A communication system according to the present embodiment includes a base station apparatus (a transmission device, cells, a transmission point, a group of transmit antennas, a group of transmit antenna ports, component carriers, eNodeB an access point, AP, a wireless router, a relay. and communication device) and a terminal apparatus (a terminal, a mobile terminal, a reception point, a reception terminal, a receiver, a group of receive antennas, a group of receive antenna ports, a UE, a station, STA).

According to the present embodiment, "X/Y" includes the meaning of "X or Y". According to the present embodiment, "X/Y" includes the meaning of "X and Y". According to the present embodiment, "X/Y" includes the meaning of "X and/or Y".

1. First Embodiment

Figure 1:
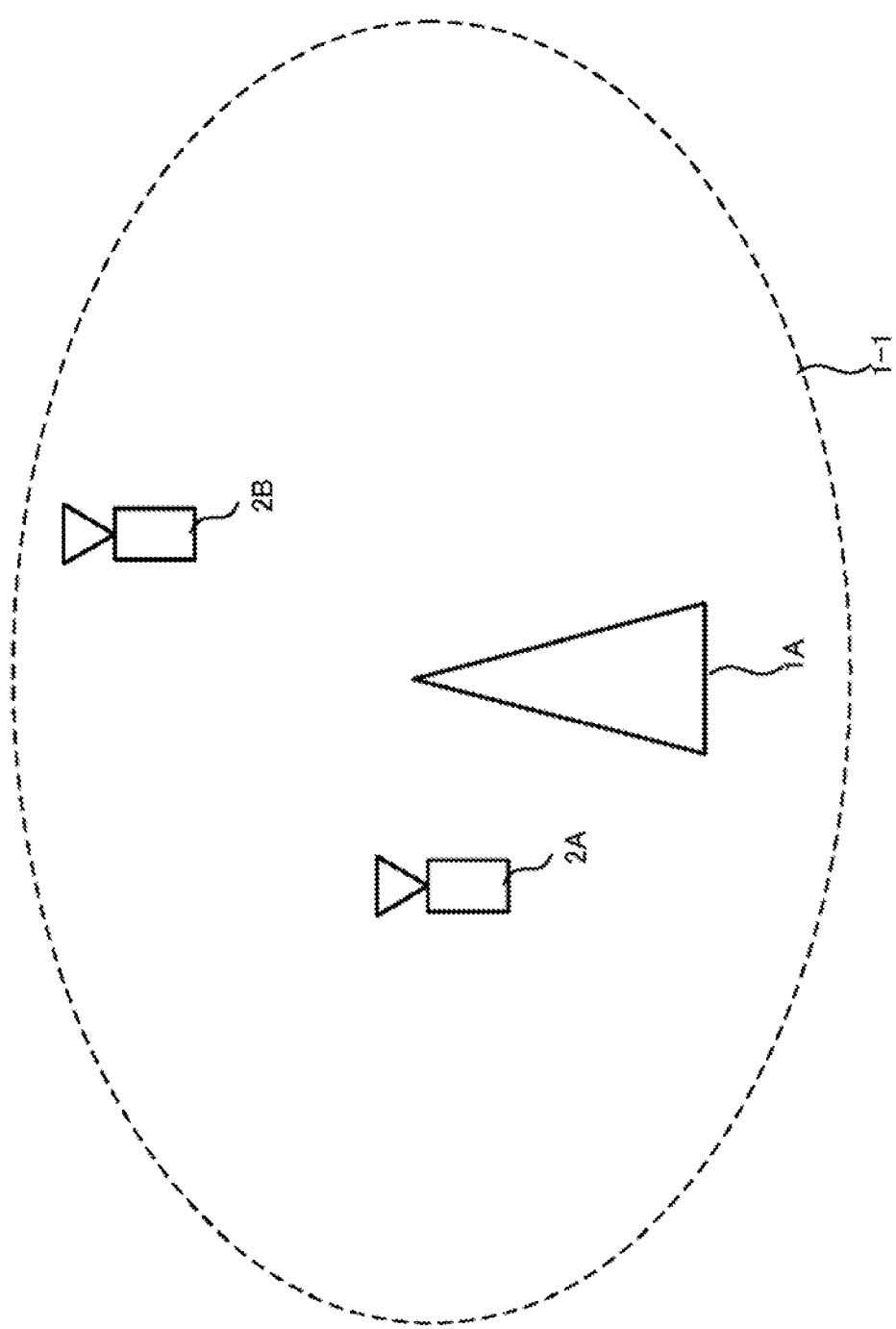
FIG. 1 is a diagram illustrating an example of a communication system according to an aspect of the present invention.

FIG. 1 is a diagram illustrating an example of a communication system according to the present embodiment. As illustrated in FIG. 1, the communication system according to the present embodiment includes a base station apparatus 1A (simply referred to as a base station apparatus 1) and terminal apparatuses 2A and 2B. Coverage 1-1 is a range (a communication area) in which the base station apparatus 1A can connect to the terminal apparatuses. Note that the communication system according to the present embodiment can include a plurality of base station apparatuses (for example, the base station apparatus 1B) and three or more terminal apparatuses.

With respect to FIG. 1, the following uplink physical channels are used for uplink radio communication from the terminal apparatus 2 to the base station apparatus 1A. The uplink physical channels are used for transmitting information output from a higher layer.

Physical uplink control channel (PUCCH)
Physical uplink shared channel (PUSCH)
Physical random access channel (PRACH)

The PUCCH is used to transmit uplink control information (UCI). The Uplink Control Information includes a positive ACKnowledgement (ACK) or a Negative ACKnowledgement (NACK) (ACK/NACK) for downlink data (a downlink transport block or a Downlink-Shared CHannel (DL-SCH)). ACK/NACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared CHannel (UL-SCH) resource. The Channel State Information refers to a Rank Indicator (RI) specifying a suited number of spatial multiplexing, a Precoding Matrix Indicator (PMI) specifying a suited precoder, a Channel Quality Indicator (CQI) specifying a suited transmission rate, and the like.

The Channel Quality Indicator (hereinafter, referred to as a CQI value) can be a modulation scheme (for example, QPSK, 16QAM, 64QAM, 256QAM, or the like) and a coding rate suited in a predetermined band (details of which will be described later). The CQI value can be an index (CQI Index) determined by the above change scheme, coding rate, and the like. The CQI value can take a value determined beforehand in the system.

The Rank Indicator and the Precoding Quality Indicator can take the values determined beforehand in the system. Each of the Rank Indicator, the Precoding Matrix Indicator, and the like can be an index determined by the number of spatial multiplexing, Precoding Matrix information, or the like. Note that values of the Rank Indicator, the Precoding Matrix Indicator, and the Channel Quality Indicator are collectively referred to as CSI values.

PUSCH is used for transmission of uplink data (an uplink transport block, UL-SCH). Furthermore, PUSCH may be used for transmission of ACK/NACK and/or Channel State Information along with the uplink data. In addition, PUSCH may be used to transmit the Uplink Control Information only.

PUSCH is used to transmit an RRC message. The RRC message is a signal/information that is processed in a Radio Resource Control (RRC) layer. Further, PUSCH is used to transmit an MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

The PRACH is used to transmit a random access preamble.

In the uplink radio communication, an UpLink Reference Signal (UL RS) is used as an uplink physical signal. The uplink physical signal is not used for transmission of information output from higher layers, but is used by the physical layer. The Uplink Reference Signal includes a DeModulation Reference Signal (DMRS) and a Sounding Reference Signal (SRS).

The DMRS is associated with transmission of the PUSCH or the PUCCH. For example, the base station apparatus 1A uses DMRS in order to perform channel compensation of PUSCH or PUCCH. The SRS is not associated with the transmission of the PUSCH or the PUCCH. For example, the base station apparatus 1A uses SRS to measure an uplink channel state. The base station apparatus 1A may notify the configuration information of the SRS in the upper layer signaling or the DCI format described later. The base station apparatus 1A may notify the configuration information of the DMRS in the upper layer signaling or the DCI format described later.

Multiple methods to rigger the SRS may be defined. For example, in the trigger type 0 the signaling of the upper layer is the trigger, and in the trigger type 1 the downlink control information, described later, is the trigger.

The SRS includes a cell specific SRS (Common SRS) and a UE specific SRS (Dedicated SRS). The UE-specific SRS includes a periodically transmitted SRS (UE-specific periodic SRS) and an SRS transmitted aperiodically based on a trigger (UE-specific aperiodic SRS).

A transmission bandwidth (srs-BandwidthConfig) of and a subframe in which to transmit (srs-SubframeConfig) a Common SRS are designated by upper layer signaling or downlink control information to be described later. In addition, the Commmon SRS is not transmitted in a subframe that includes a PUCCH including at least one out of a HARQ-ACK and a SR in a case that a predetermined parameter (for example, ackNackSRS-Simultaneous Transmission) is False. On the contrary, the Commmon SRS may be transmitted in a subframe that includes a PUCCH including at least one out of a HARQ-ACK and a SR in a case that a predetermined parameter (for example, ackNackSRS-Simultaneous Transmission) is True.

For the Dedicated SRS, a transmission bandwidth, a hopping bandwidth (srs-HoppingBandwidth), a frequency allocation start position (freqDomainPosition), a transmission duration (Duration) (single transmission or indefinite transmission), a transmission cycle (srs-ConfigIndex), a cyclic shift amount (cyclicShift) given to the SRS signal sequence, and a position of the SRS formed on the comb teeth (transmissionComb) are respectively configured by upper layer signaling or downlink control information to be described later.

The SRS can be transmitted from a plurality of antenna ports. The number of antenna ports for the transmission is configured by signaling of the upper layer. A UE which is configured to transmit a SRS from a plurality of antenna ports must transmit the SRS from all of the configured transmission antenna ports to the serving cell using a single SC-FDMA symbol of the same subframe. In this case, the same transmission bandwidth and the frequency allocation start position are configured for all of the SRSs transmitted from the configured transmission antenna port.

UEs that do not have multiple Transmission advance groups (TAGs) configured may not transmit a SRS unless the SRS and a PUSCH overlap each other in the same symbol.

In a case that one SC-FDMA symbol is included in the UpPTS of a serving cell for the serving cell of the TDD, the UE may use the SC-FDMA symbol to transmit the SRS. In a case that two SC-FDMA symbols are included in the UpPTS of the serving cell, the UE may use both of the two SC-FDMA symbols to transmit the SRS. In addition, the SRS of the trigger type 0 may be configured to both of the two SC-FDMA symbols as the SRS with respect to the same UE.

In FIG. 1, for example, the following downlink physical channels are used for the downlink radio communication from the base station apparatus 1A to the terminal apparatus 2A. The downlink physical channels are used for transmitting information output from the higher layer.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)

PBCH is used for broadcasting a Master Information Block (MIB, a Broadcast CHannel (BCH)) that is shared by the terminal apparatuses. PCFICH is used for transmission of information indicating a region (e.g., the number of OFDM symbols) to be used for transmission of PDCCH.

PHICH is used for transmission of ACK/NACK with respect to uplink data (a transport block, a codeword) received by the base station apparatus 1A. In other words, PHICH is used for transmission of a HARQ indicator (HARQ feedback) indicating ACK/NACK with respect to the uplink data. Note that ACK/NACK is also called HARQ-ACK. The terminal apparatus 2A reports ACK/NACK having been received to a higher layer. ACK/NACK refers to ACK indicating a successful reception, NACK indicating an unsuccessful reception, and DTX indicating that no corresponding data is present. In a case that PHICH for uplink data is not present, the terminal apparatus 2A reports ACK to a higher layer.

The PDCCH and the EPDCCH are used to transmit downlink control information (DCI). Here, multiple DCI formats are defined for transmission of the downlink control information. In other words, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information on the PDSCH resource allocation, information on a Modulation and Coding Scheme (MCS) for the PDSCH, a TPC command for the PUCCH, and the like. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information on the PUSCH resource allocation, information on a MCS for the PUSCH, a TPC command for the PUSCH, and the like. Here, the DCI format for the uplink is also referred to as uplink grant (or uplink assignment).

Further, the DCI format for uplink may be used for requesting (CSI request) downlink channel state information (CSI, also referred to as "reception quality information"). The Channel State Information refers to the Rank Indicator (RI) specifying a suited number of spatial multiplexing, the Precoding Matrix Indicator (PMI) specifying a suited precoder, the Channel Quality Indicator (CQI) specifying a suited transmission rate, a Precoding Type Indicator (PTI), and the like.

The DCI format for the uplink can be used for a configuration indicating an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

For example, the CSI feedback report can be used for a configuration indicating an uplink resource to report aperiodic Channel State Information (aperiodic CSI). The CSI feedback report can be used for a mode configuration (CSI report mode) to aperiodically report the Channel State Information. The base station apparatus can configure any one of the periodic CSI feedback report and the aperiodic CSI feedback report. In addition, the base station apparatus can configure both the periodic CSI feedback report and the aperiodic CSI feedback report.

The DCI format for the uplink can be used for a configuration indicating a type of the CSI feedback report that is fed back to the base station apparatus by the terminal apparatus. The type of the CSI feedback report includes wideband CSI (for example, Wideband CQI), narrowband CSI (for example, Subband CQI), and the like.

In a case where a PDSCH resource is scheduled in accordance with the downlink assignment, the terminal apparatus receives downlink data on the scheduled PDSCH. In a case where a PUSCH resource is scheduled in accordance with the uplink grant, the terminal apparatus transmits uplink data and/or uplink control information of the scheduled PUSCH.

PDSCH is used for transmission of downlink data (a downlink transport block, DL-SCH). PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

PDSCH is used to transmit an RRC message. Here, the RRC message transmitted from the base station apparatus may be shared by multiple terminal apparatuses in a cell. Further, the RRC message transmitted from the base station apparatus 1A may be a dedicated message to a given terminal apparatus 2 (also referred to as dedicated signaling). In other words, user-equipment-specific information (unique to user equipment) is transmitted using a message dedicated to the given terminal apparatus. PDSCH is used for transmission of MAC CE.

Here, the RRC message and/or MAC CE is also referred to as higher layer signaling.

PDSCH can be used to request downlink channel state information. PDSCH can be used for transmission of an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

The type of the downlink CSI feedback report includes wideband CSI (e.g., Wideband CSI) and narrowband CSI (e.g., Subband CSI). The wideband CSI calculates one piece of Channel State Information for the system band of a cell. The narrowband CSI divides the system band in predetermined units, and calculates one piece of Channel State Information for each division.

In the downlink radio communication, a Synchronization signal (SS) and a DownLink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and the time domain in the downlink. The Downlink Reference Signal is used for the terminal apparatus to perform channel compensation on a downlink physical channel. For example, the Downlink Reference Signal is used for the terminal apparatus to calculate the downlink Channel State Information.

Here, the Downlink Reference Signals include a Cell-specific Reference Signal (CRS), a UE-specific Reference Signal (URS), a DeModulation Reference Signal (DMRS), a Non-Zero Power Channel State Information-Reference Signal (NZP CSI-RS), and a Zero Power Channel State Information-Reference Signal (ZP CSI-RS).

CRS is transmitted in all bands of a subframe and is used to perform demodulation of PBCH/PDCCH/PHICH/PCFICH/PDSCH. URS relating to PDSCH is transmitted in a subframe and a band that are used for transmission of PDSCH to which URS relates, and is used to demodulate PDSCH to which URS relates.

DMRS relating to EPDCCH is transmitted in a subframe and a band that are used for transmission of EPDCCH to which DMRS relates. DMRS is used to demodulate EPDCCH to which DMRS relates.

A resource for NZP CSI-RS is configured by the base station apparatus 1A. The terminal apparatus 2A performs signal measurement (channel measurement), using NZP CSI-RS. A resource for ZP CSI-RS is configured by the base station apparatus 1A. With zero output, the base station apparatus 1A transmits ZP CSI-RS. The terminal apparatus 2A performs interference measurement in a resource to which NZP CSI-RS corresponds, for example.

A Multimedia Broadcast multicast service Single Frequency Network (MBSFN) RS is transmitted in all bands of the subframe used for transmitting PMCH. MBSFN RS is used to demodulate PMCH. PMCH is transmitted on the antenna port used for transmission of MBSFN RS.

Here, the downlink physical channel and the downlink physical signal are also collectively referred to as a downlink signal. The uplink physical channel and the uplink physical signal are also collectively referred to as an uplink signal. The downlink physical channels and the uplink physical channels are collectively referred to as physical channels. The downlink physical signals and the uplink physical signals are also collectively referred to as physical signals.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing is performed for each codeword.

Also, the base station apparatus can communicate integrating a plurality of component carriers (CC) for a broader band transmission with a terminal apparatus supporting carrier aggregation (CA). In carrier aggregation, one primary cell (PCell) and one or more secondary cells (SCell) are configured as an aggregation of serving cells.

In dual connectivity (DC), a master cell group (MCG) and a secondary cell group (SCG) are configured as groups of serving cells. The MCG consists of a PCell and optionally one or more SCells. In addition, the SCG consists of a primary SCell (PSCell) and optionally one or more SCells.

Figure 2:
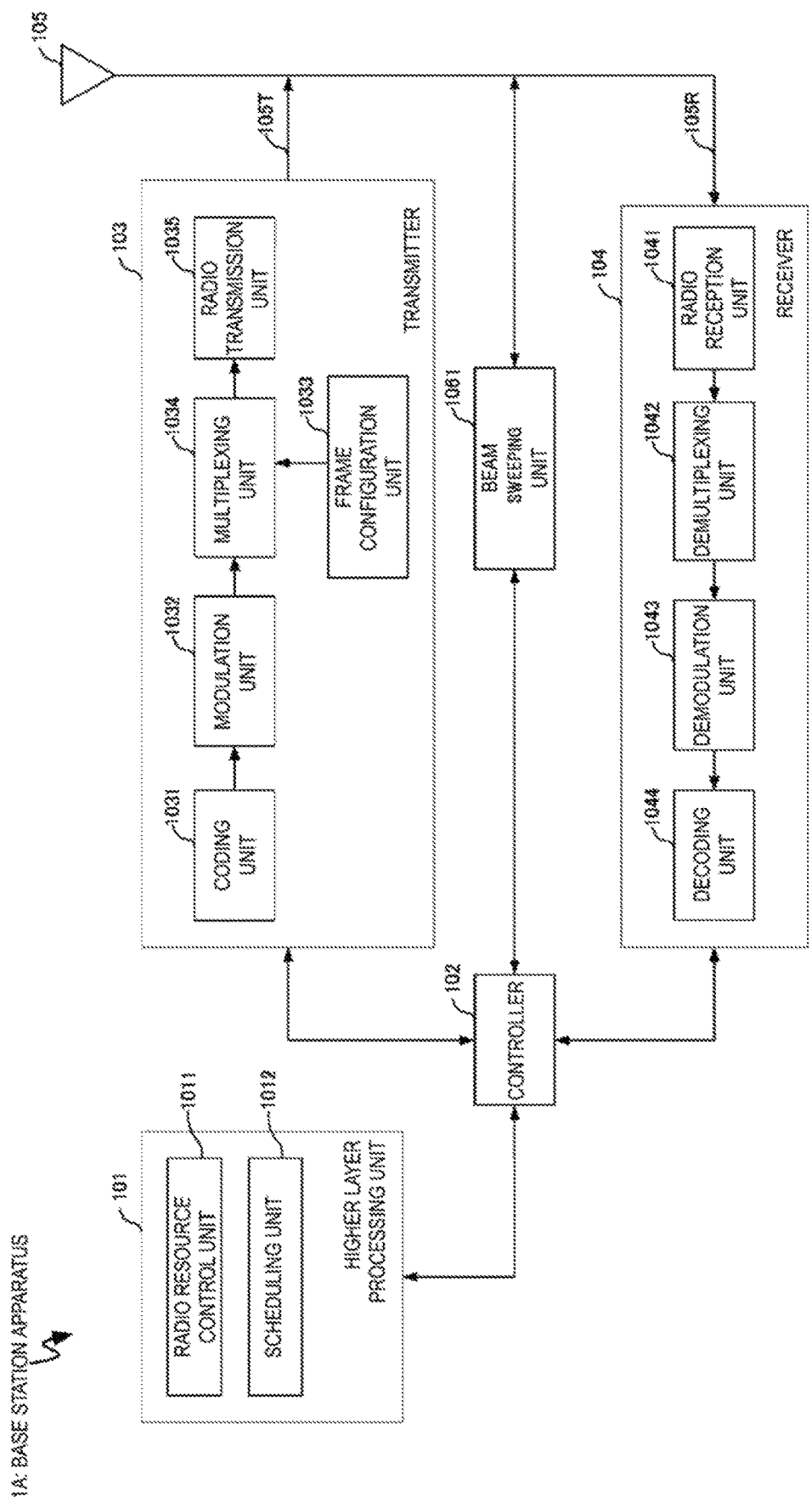
FIG. 2 is a block diagram illustrating an example of a configuration of a base station apparatus according to an aspect of the present invention.

FIG. 2 is a schematic block diagram illustrating a configuration of the base station apparatus 1A according to the present embodiment. As illustrated in FIG. 2, the base station apparatus 1A is configured, including a higher layer processing unit (higher layer processing step) 101, a controller (controlling step) 102, a transmitter (transmitting step) 103, a receiver (receiving step) 104, a transmit and/or receive antenna (an antenna unit) 105 and a beam sweeping unit (beam sweeping step) 1061. The higher layer processing unit 101 is configured, including a radio resource control unit (radio resource controlling step) 1011 and a scheduling unit (scheduling step) 1012. The transmitter 103 is configured, including a coding unit (coding step) 1031, a modulation unit (modulating step) 1032, a frame configuration unit (frame configuration step) 1033, a multiplexing unit (multiplexing step) 1034, and a radio transmitting unit (radio transmitting step) 1035. The receiver 104 is configured, including a radio reception unit (radio receiving step) 1041, a demultiplexing unit (demultiplexing step) 1042, a demodulation unit (demodulating step) 1043, and a decoding unit (decoding step) 1044.

The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates information necessary for control of the transmitter 103 and the receiver 104, and outputs the generated information to the controller 102.

The higher layer processing unit 101 receives information on a terminal apparatus, such as function of the terminal apparatus (UE capability, function information) or the like, from the terminal apparatus. To rephrase, the terminal apparatus transmits its function to the base station apparatus by higher layer signaling.

Note that in the following description, information of a terminal apparatus includes information indicating whether the stated terminal apparatus supports a prescribed function, or information indicating that the stated terminal apparatus has completed the introduction and test of a prescribed function. In the following description, information of whether the prescribed function is supported includes information of whether the introduction and test of the prescribed function have been completed.

For example, in a case where a terminal apparatus supports a prescribed function, the stated terminal apparatus transmits information (parameters) indicating whether the prescribed function is supported. In a case where a terminal apparatus does not support a prescribed function, the stated terminal apparatus does not transmit information (parameters) indicating whether the prescribed function is supported. In other words, whether the prescribed function is supported is reported by whether information (parameters) indicating whether the prescribed function is supported is transmitted. Information (parameters) indicating whether a prescribed function is supported may be reported using one bit of 1 or 0.

The radio resource control unit 1011 generates, or acquires from a higher node, the downlink data (the transport block) disposed in the downlink PDSCH, system information, the RRC message, the MAC Control Element (CE), and the like. The radio resource control unit 1011 outputs the downlink data to the transmitter 103, and outputs other information to the controller 102. Furthermore, the radio resource control unit 1011 manages various configuration information of the terminal apparatuses.

The scheduling unit 1012 determines a frequency and a subframe to which the physical channels (the PDSCH and the PUSCH) are allocated, the coding rate and modulation scheme (or MCS) for the physical channels (the PDSCH and the PUSCH), the transmit power, and the like. The scheduling unit 1012 outputs the determined information to the controller 102.

The scheduling unit 1012 generates the information to be used for the scheduling of the physical channels (PDSCH and PUSCH), based on the result of the scheduling. The scheduling unit 1012 outputs the generated information to the controller 102.

Based on the information input from the higher layer processing unit 101, the controller 102 generates a control signal for controlling of the transmitter 103 and the receiver 104. The controller 102 generates the downlink control information based on the information input from the higher layer processing unit 101, and outputs the generated information to the transmitter 103.

The transmitter 103 generates the downlink reference signal in accordance with the control signal input from the controller 102, codes and modulates the HARQ indicator, the downlink control information, and the downlink data that are input from the higher layer processing unit 101, performs multiplexing with the PHICH, the PDCCH, the EPDCCH, the PDSCH, and the downlink reference signal, and transmits the signal to the terminal apparatus 2 through the transmit and/or receive antenna 105.

The coding unit 1031 codes the HARQ indicator, the downlink control information, and the downlink data that are input from the higher layer processing unit 101, in compliance with the coding scheme prescribed in advance, such as block coding, convolutional coding, or turbo coding, or in compliance with the coding scheme determined by the radio resource control unit 1011. The modulation unit 1032 modulates the coded bits input from the coding unit 1031, in compliance with the modulation scheme prescribed in advance, such as Binary Phase Shift Keying (BPSK), Quadrature Phase Shift Keying (QPSK), quadrature amplitude modulation (16QAM), 64QAM, or 256QAM, or in compliance with the modulation scheme determined by the radio resource control unit 2011.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements. It is to be noted that the downlink reference signal is generated by the transmitter 103 in accordance with a sequence known to the terminal apparatus 2A and which can be obtained with a predetermined rule based on a physical cell identifier (PCI, cell ID) or the like for identifying the base station apparatus 1A.

The frame configuration unit 1033 provides the frame configuration (frame format, frame architecture, frame structure) of the transmission signal generated by the transmitter 103. The operation of the frame configuration unit 1033 will be described later. In the following description, it is assumed that the transmitter 103 includes the frame configuration unit 1033, but other constituent unit may have the function of the frame configuration unit 1033 to be explained later. For example, the upper layer processing unit 101 may have this function.

The radio transmitting unit 1035 performs Inverse Fast Fourier Transform (IFFT) on the multiplexed modulation symbol and the like, generates an OFDM symbol, attaches a Cyclic Prefix (CP) to the OFDM symbol, generates a baseband digital signal, converts the baseband digital signal into an analog signal, removes unnecessary frequency components through filtering, and perform output to the antenna 105.

Figure 3:
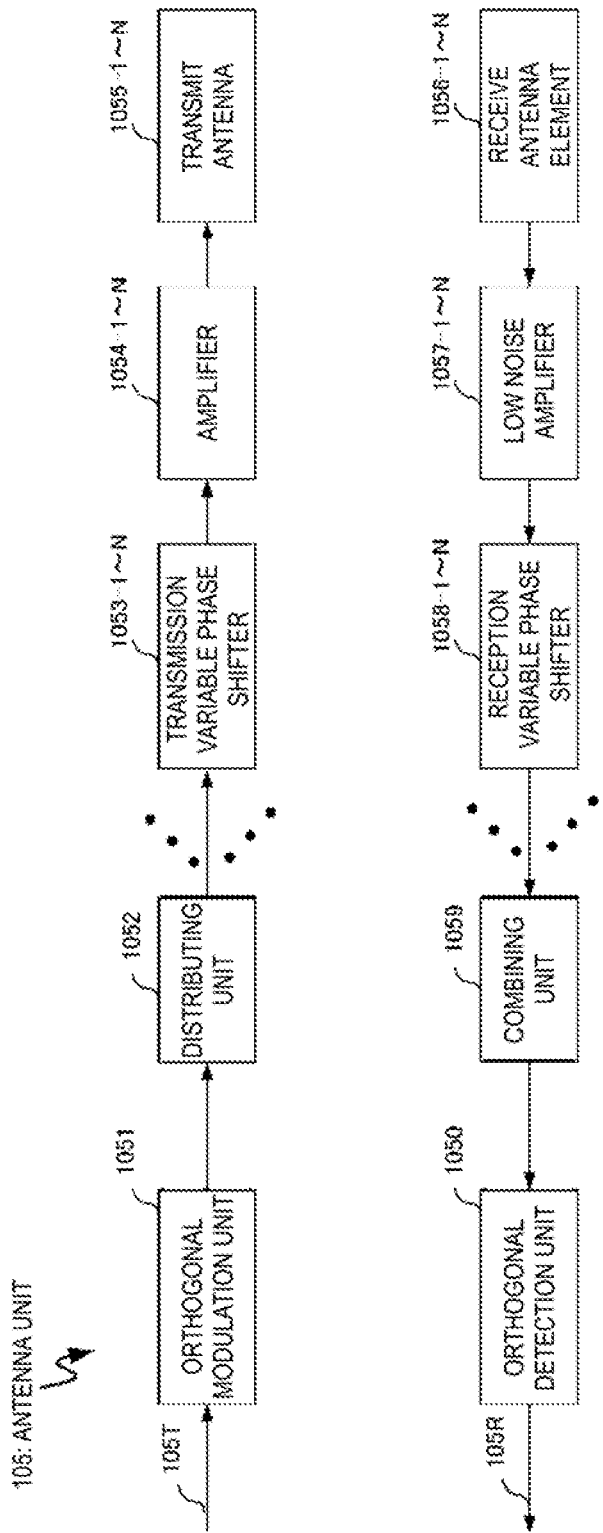
FIG. 3 is a block diagram illustrating an example of a configuration of an antenna according to an aspect of the present invention.

FIG. 3 is a block diagram illustrating an example of a configuration of the antenna 105 according to the present embodiment. As illustrated in FIG. 3, the antenna 105 at least includes a quadrature modulation unit 1051, a distributing unit 1052, transmission variable phase shifters 1053-1 to 1053-N, amplifiers 1054-1 to 1054-N, transmit antenna elements 1055-1 to 1055-N, receive antenna elements 1056-1 to 1056-N, low noise amplifiers 1057-1 to 1057-N, reception variable phase shifters 1058-1 to 1058-N, a combining unit 1059, and an orthogonal detection unit 1050. Note that the transmission variable phase shifter 1053 and the reception variable phase shifter 1058 may be common. The transmit antenna elements 1055-1 to 1055-N and the receive antenna elements 1056-1 to 1056-N may be common. In the following description, it is assumed that the number of transmitting antenna elements and the number of receiving antenna elements is N, but in the method according to this embodiment, the number of N is not limited at all. Naturally, the number of transmitting antenna elements and the number of receiving antenna elements may be different. Note that 105T is an antenna input which is output from the transmitter 103, and 105R is an antenna output which is input to the receiver 104.

The orthogonal modulation unit 1051 up-converts the signal input from the transmitter 103 to the carrier frequency. The distributing unit 1052 distributes the signal up-converted to the carrier frequency to each transmit antenna element. Transmission variable phase shifter 1053 and the amplifier 1054 change the phase and amplitude of the signal transmitted from the corresponding transmit antenna element 1055, respectively.

In the present embodiment, the number of signal inputs to the orthogonal modulation unit 1051 is defined as the number of inputs to the antenna 105. Generally, in a phase modulation signal such as QPSK, two signals which are an in-phase axis signal (I axis signal) and an orthogonal axis signal (Q axis signal) are input to the orthogonal modulation unit 1051. In the present embodiment, an I axis signal and a Q axis signal are collectively counted as one signal. Since the I axis signal and the Q axis signal are generated by a digital/analog converter (DAC) (not illustrated in FIGS. 2 and 3) with respect to signals in the baseband band, the number of DACs can be said to be the number of inputs to the antenna 105. Naturally, for each modulation signal, one DAC each is required for the I axis signal and the Q axis signal, and a DAC for the I axis signal and a DAC for the Q axis signal are collectively counted as one DAC.

Note that the configuration of the antenna 105 according to the present embodiment is not limited to the example in FIG. 3. For example, the orthogonal modulation unit 1051 may be included in the transmitter 103. In this case, the number of outputs of the orthogonal modulation unit 1051 is the number of inputs to the antenna 105. Furthermore, the distributing unit 1052 may also be included in the transmitter 103. In this case, the number of inputs to the antenna 105 is the number of outputs of the distributing unit 1052.

However, since the signals output from the distributing unit 1052 are the same signals, the number of distributing units 1052 will be described as the number of inputs to the antenna 105. Further, the antenna 105 may further include an amplifier between the distributing unit 1052 and the orthogonal modulation unit 1051. Further, the amplifier 1054 of the antenna 105 may be placed in front of the transmission variable phase shifter 1053.

The beam sweeping unit 1061 according to the present embodiment is capable of controlling the transmission variable phase shifter 1053 and the amplifier 1054. The following description will refer to the case in which a transmit beam control unit 1036 controls the transmission variable phase shifter 1053, however the case in which the transmit beam control unit 1036 controls only the amplifier 1054, and the case in which the transmit beam control unit 1036 controls both the transmission variable phase shifter 1053 and the amplifier 1054 is also included in the present embodiment.

Figure 4:
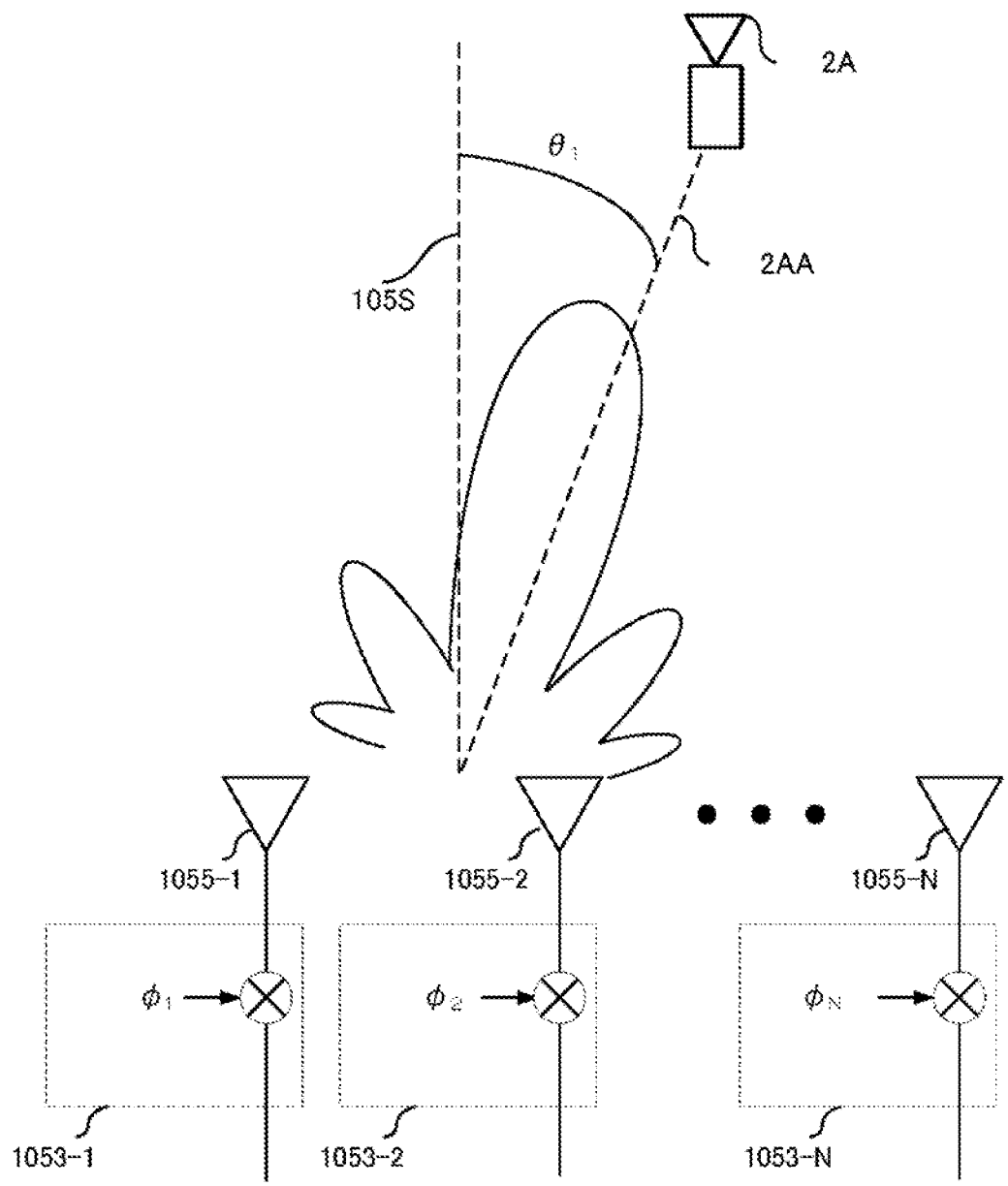
FIG. 4 is a schematic diagram illustrating a state of antenna directivity pattern control according to an aspect of the present invention.

FIG. 4 is a schematic diagram illustrating the principle of forming a beam pattern (antenna directivity pattern). In FIG. 4, it is assumed that the N transmit antenna elements 1055 are equally spaced at the antenna spacing d to form a linear antenna array. In a case that the phase shift amount given by the transmission variable phase shifter 1053-$n$ is $\varphi_n$, and that the angle formed by the positional direction 2AA of the terminal apparatus 2A with respect to the radiation direction 105S of the antenna 105 is $\theta_1$, the reception signal of the terminal apparatus 2A is given by Equation (1).

Equation (1)

$$r = \left(\sum_{n=1}^{N} \exp(jknd\,\sin\theta_1)\,\exp(j\phi_n)\right)s + \beta \quad (1)$$

Here, s represents a downlink signal addressed to the terminal apparatus 2A generated by the transmitter 103 of the base station apparatus 1A, and the average power thereof is P. Also, $\beta$ represents the noise component of the variance (average power) $\sigma^2$ with an average of 0 observed at the terminal apparatus 2A. Also, k represents the wave number. Note that, in Equation (1), the influence of multipath fading is not considered. From Equation (1), it can be seen that the average reception signal-to-noise power ratio (SNR) $\gamma_1$ of the received signal of the terminal apparatus 2A is given by Equation (2).

Equation (2)

$$\gamma_1 = \frac{P}{\sigma^2}\left\|\sum_{n=1}^{N} \exp(jknd\,\sin\theta_1)\,\exp(j\phi_n)\right\|^2 \quad (2)$$

From Equation (2), it can be seen that the reception SNR is associated with the phase shift amount $\varphi_n$ given by the transmission variable phase shifter 1053-$n$. For example, the transmission beam control unit 1036 can improve the reception quality of the terminal apparatus 2A, since it is capable of maximizing the reception SNR of the terminal apparatus 2A by giving $\varphi_n$ that maximizes $\gamma_1$ to the transmission variable phase shifter 1053. On the other hand, since the transmission beam control unit 1036 is capable of minimizing the reception SNR of the terminal apparatus 002A by giving $\varphi_n$ that minimizes $\gamma_1$ to the transmission variable phase shifter 1053, by using this in a case of transmitting a signal to the other terminal apparatus (for example, the terminal apparatus 2B) it can perform a control such that the signal is not received by the terminal apparatus 2A. Hereinafter, the control of the beam pattern (antenna directivity pattern, antenna gain, beam gain) performed by the beam sweeping unit 1061 with respect to the terminal apparatus 2A is also referred to as the beam forming control (beam sweeping, beam control) for the terminal apparatus 2A. Further, the operation performed by the terminal apparatus 2A for the beam-forming control performed by the beam sweeping unit 1061 of the base station apparatus 1 is also referred to as beam detection (antenna pattern detection, antenna gain detection) performed by the terminal apparatus 2A.

Also, in the antenna directivity pattern generated by the antenna 105, a portion having a high gain is referred to as a main beam (main lobe) or simply a beam. The control performed by the beam sweeping unit 1061 according to the present embodiment includes a control of generating a portion with a high gain in the antenna directivity pattern preempted by the antenna 105. Also, in the antenna directivity pattern generated by the antenna 105, a portion with low gain is referred to as a null beam or simply null. The control performed by the beam sweeping unit 1061 according to the present embodiment includes a control of generating a portion with a low gain in the antenna directivity pattern by the antenna 105. Note that in the following description associated with the antenna 105, at least a part of each signal processing and control performed when the base station apparatus 1A transmits the downlink signal of the terminal apparatus 5002 can also be performed when the base station apparatus 1A receives the uplink signal of the terminal apparatus 2.

The beam sweeping method of the beam sweeping unit 1061 according to the present embodiment is not limited to any method. For example, the beam sweeping unit 1061 can direct the beam to the terminal apparatus 2 by observing the reception quality of the signal transmitted from the terminal apparatus 2. Specifically, the base station apparatus 1 can instruct the terminal apparatus 2 to periodically transmit mutually known signals (for example, reference signals) in radio resources that are also mutually known. For example, the terminal apparatus 2 can transmit the reference signal in a frequency resource designated by the base station apparatus 1 at a time period specified by the base station apparatus 1. Since the beam sweeping unit 1061 of the base station apparatus 1 can control the antenna 105 such that it receives the reference signal in each different antenna directivity pattern, the beam sweeping unit 1061 is capable of configuring the antenna 105 with an antenna directivity pattern with the main beam (or null beam) directed to the terminal apparatus 2, by measuring the reception quality of the signal received in each antenna directivity pattern and detecting the antenna directivity pattern with the best/favorable (or poor) antenna directivity pattern. Further, the beam sweeping unit 1061 of the base station apparatus 1 can perform beam sweeping based on the signal transmitted from the terminal apparatus 2 without explicitly instructing the terminal apparatus 2 to transmit the reference signal. Note that, in the above example, the operation in which the terminal apparatus 2 transmits the reference signal to the base station apparatus 1 is included in the beam detection operation performed by the terminal apparatus 2.

The base station apparatus 1 according to the present embodiment can transmit a signal (for example, a reference signal) with different antenna directivity patterns in different radio resources. The base station apparatus 1 is capable of controlling the antenna directivity pattern of the antenna 105 based on information, which is the information obtained from the terminal apparatus 2 and indicating the reception quality of each of the different radio resources (for example, information indicating a radio resource with the best reception quality, information indicating a radio resource with the lowest reception quality, information indicating the reception quality of each radio resource itself, and the like).

Note that in a case that the base station apparatus 1 transmits a plurality of CSI-RSs each with different antenna directivity pattern, the information (index) indicating the CSI-RS resources with the best reception quality/the poorest reception quality is also referred to as CRI (CSI-RS Resource Indication). Further, the reception power measured by CSI-RS is also referred to as the CSI-RSRP (Reference Signal Received Power). Further, the reception power measured by CSI-RS is also referred to as the CSI-RSRQ (Reference Signal Received Quality). Note that, the base station apparatus 1 can transmit the CSI-RS by including it in the discovery signal. The discovery signal includes a cell-specific reference signal, a synchronization signal, a part or all of the CSI-RS. It should be noted that the terminal apparatus 2 can report the CRI and the combination of the CSI-RSRP/RSRQ in the CSI-RS resource to the base station apparatus 1. Note that, according to the above example, the operation by the terminal apparatus 2 to measure the information indicating the reception quality of each of the different radio resources, and to notify the information indicating the reception quality to the base station is included in the beam detection operations performed by the apparatus 2. Note that, in a case that the base station apparatus 1 transmits a signal (for example, a reference signal) with different antenna directivity patterns in a plurality of radio resources, the terminal apparatus 2 performs the RRM (Radio Resource Management) measurement (for example, RSRP, RSRQ) and the CSI measurement (for example, channel measurement, interference measurement) which are limited to each of the radio resources. It should be noted that the base station apparatus 1 can configure a measurement limit for each radio resource.

As a result of the detail described above, the beam sweeping unit 1061 according to the present embodiment is capable of performing beam sweeping by controlling the transmission variable phase shifter 1053 and the amplifier 1054 of the antenna 105. Namely, the beam sweeping unit 1061 according to the present embodiment can perform beam sweeping related to analog beam forming. The beam sweeping unit 1061 according to the present embodiment can also perform beam sweeping on digital beam forming for controlling the antenna directivity pattern of the antenna 105 by controlling the antenna input 105 itself. For example, the beam sweeping unit 1061 can control precoding processing performed by the transmitter 103 on the baseband signal of the transmission signal.

In addition, the beam sweeping unit 1061 according to the present embodiment can perform beam sweeping related to hybrid beam forming that performs both analog beam forming and digital beam forming. In the hybrid beamforming, the beam sweeping unit 1061 can simultaneously perform beam sweeping related to analog beam forming and beam sweeping related to digital beam forming, or they can be independently performed. It should be noted that the analog beam sweeping may be beam-swept in the time domain and the digital beamforming may be beam-swept in the frequency domain. In this case, the base station apparatus 1 may transmit a plurality of time resources (for example, OFDM symbols, subframes) by giving different analog beam patterns to each, and transmit a plurality of frequency resources (subcarriers, resource blocks) by giving different digital beam patterns to each. The terminal apparatus 2 may report the information indicating the most suitable time resource and the information indicating the most suitable frequency resource to the base station apparatus 1. It should be noted that the analog beam sweeping may be performed by beam sweeping with a coarse beam pattern (wide beam width), and the digital beam sweeping may be performed by beam sweeping with a narrow beam pattern (narrow beam width). In this case, the terminal apparatus 2 reports the information indicating the suitable analog beam (the information indicating the radio resource with the best reception quality) at a longer interval than the information indicating the suitable digital beam (the information indicating the radio resource with the best reception quality) to the base station apparatus 1.

In accordance with the control signal input from the controller 102, the receiver 104 demultiplexes, demodulates, and decodes the reception signal received from the terminal apparatus 2A through the transmit and/or receive antenna 105, and outputs information resulting from the decoding to the higher layer processing unit 101.

In accordance with the control signal input from the controller 102, the receiver 104 demultiplexes, demodulates, and decodes the reception signal received from the terminal apparatus 2A through the transmit and/or receive antenna 105, and outputs information resulting from the decoding to the higher layer processing unit 101.

The radio reception unit 1041 converts, by down-converting, an uplink signal received through the antenna 105 into a baseband signal, removes unnecessary frequency components, controls the amplification level in such a manner as to suitably maintain a signal level, performs quadrature demodulation based on an in-phase component and an orthogonal component of the received signal, and converts the resulting orthogonally-demodulated analog signal into a digital signal.

The radio reception unit 1041 removes a portion corresponding to CP from the digital signal resulting from the conversion. The radio reception unit 1041 performs Fast Fourier Transform (FFT) on the signal from which CP has been removed, extracts a signal in the frequency domain, and outputs the resulting signal to the demultiplexing unit 1042.

The demultiplexing unit 1042 demultiplexes the signal input from the radio reception unit 1041 into the signal such as PUCCH, PUSCH, and the uplink reference signal. Note that, the demultiplexing is performed based on radio resource allocation information that is determined in advance by the base station apparatus 1A in the radio resource control unit 1011 and that is included in the uplink grant notified to each of the terminal apparatuses 2.

Furthermore, the demultiplexing unit 1042 makes a compensation of channels including PUCCH and PUSCH. The demultiplexing unit 1042 demultiplexes the uplink reference signal.

The demodulation unit 1043 performs Inverse Discrete Fourier Transform (IDFT) on PUSCH, acquires modulation symbols, and performs reception signal demodulation, that is, demodulates each of the modulation symbols of PUCCH and PUSCH, in compliance with the modulation scheme prescribed in advance, such as BPSK, QPSK, 16QAM, 64QAM, 256QAM, or the like, or in compliance with the modulation scheme that the base station apparatus 1A itself notified in advance, with the uplink grant, each of the terminal apparatuses 2.

The decoding unit 1044 decodes the coded bits of PUCCH and PUSCH, which have been demodulated, at the coding rate in compliance with a coding scheme prescribed in advance, the coding rate being prescribed in advance or being notified in advance with the uplink grant to the terminal apparatus 2 by the base station apparatus 1A itself, and outputs the decoded uplink data and uplink control information to the higher layer processing unit 101. In a case where PUSCH is re-transmitted, the decoding unit 1044 performs the decoding with the coded bits input from the higher layer processing unit 101 and retained in an HARQ buffer, and the demodulated coded bits.

Figure 5:
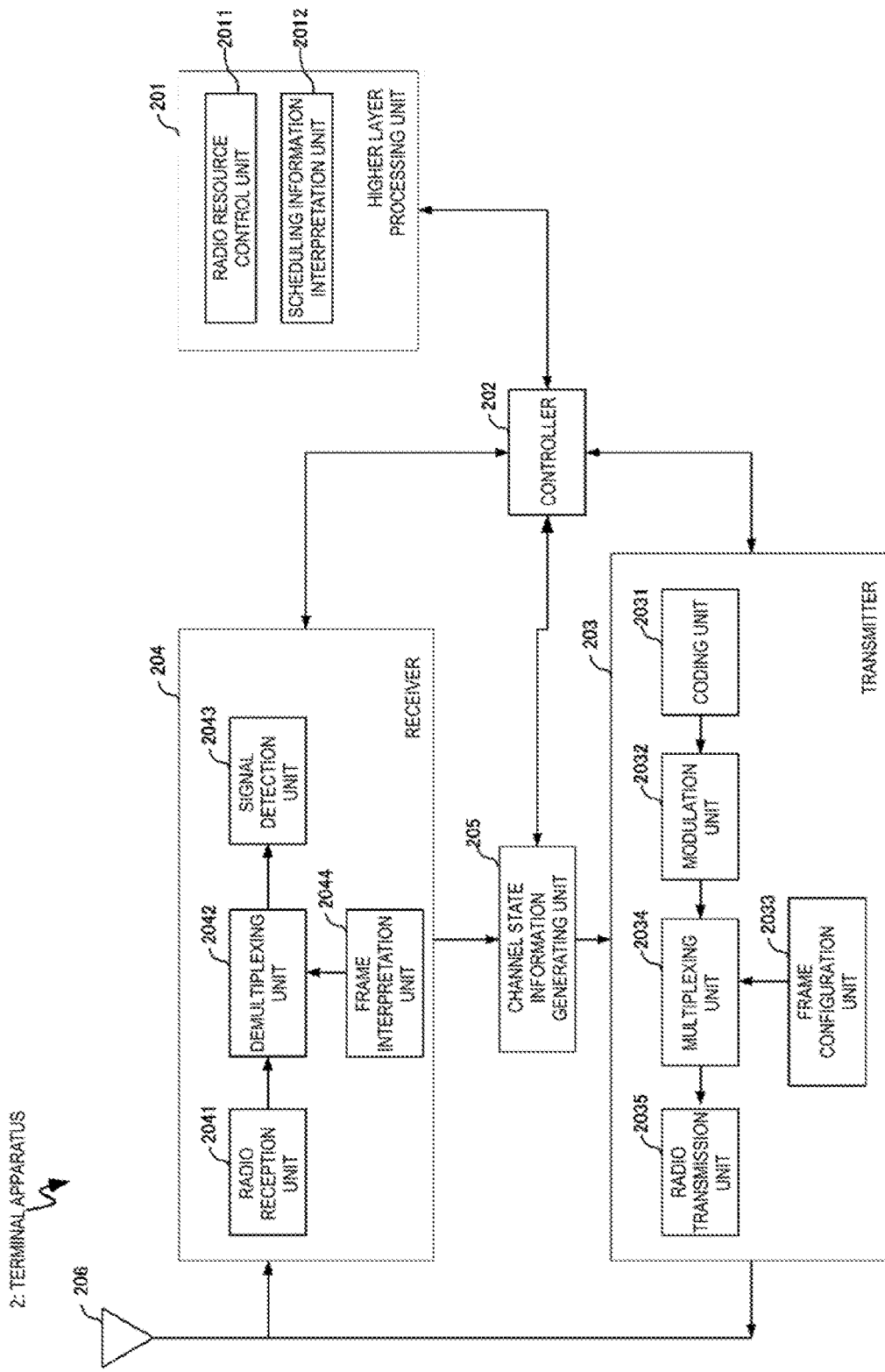
FIG. 5 is a block diagram illustrating an example of a configuration of a terminal apparatus according to an aspect of the present invention.

FIG. 5 is a schematic block diagram illustrating a configuration of the terminal apparatus 2 (the terminal apparatus 2A and the terminal apparatus 2B) according to the present embodiment. As illustrated in FIG. 5, the terminal apparatus 2A is configured, including a higher layer processing unit (higher layer processing step) 201, a controller (controlling step) 202, a transmitter (transmitting step) 203, a receiver (receiving step) 204, a channel state information generating unit (channel state information generating step) 205, and an antenna 206. The higher layer processing unit 201 is configured, including a radio resource control unit (radio resource controlling stop) 2011 and a scheduling information interpretation unit (scheduling information interpreting step) 2012. In addition, the transmitter 203 is configured, including a coding unit (coding step) 2031, a modulation unit (modulating step) 2032, a frame configuration unit (frame configuration step) 2033, a multiplexing unit (multiplexing step) 2034, and a radio transmitting unit (radio transmitting step) 2035. Further, the receiver 204 is configured, including a radio reception unit (radio receiving step) 2041, a demultiplexing unit (demultiplexing step) 2042, a signal detection unit (signal detecting step) 2043, and a frame interpretation unit (frame interpretation step).

The higher layer processing unit 201 outputs the uplink data (the transport block) generated by a user operation or the like, to the transmitter 203. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information indicating a terminal apparatus function supported by the terminal apparatus 2A itself.

Furthermore, the radio resource control unit 2011 manages various configuration information of the terminal apparatuses 2A itself. Furthermore, the radio resource control unit 2011 generates information to be mapped to each uplink channel, and outputs the generated information to the transmitter 203.

The radio resource control unit 2011 acquires configuration information of CSI feedback transmitted from the base station apparatus, and outputs the acquired information to the controller 202.

The scheduling information interpretation unit 2012 interprets the downlink control information received through the receiver 204, and determines scheduling information. The scheduling information interpretation unit 2012 generates the control information in order to control the receiver 204 and the transmitter 203 in accordance with the scheduling information, and outputs the generated information to the controller 202.

On the basis of the information input from the higher layer processing unit 201, the controller 202 generates a control signal for controlling the receiver 204, the channel state information generating unit 205, and the transmitter 203. The controller 202 outputs the generated control signal to the receiver 204, the channel state information generating unit 205, and the transmitter 203 to control the receiver 204 and the transmitter 203.

The controller 202 controls the transmitter 203 to transmit CSI generated by the channel state information generating unit 205 to the base station apparatus.

In accordance with the control signal input from the controller 202, the receiver 204 demultiplexes, demodulates, and decodes a reception signal received from the base station apparatus 1A through the antenna 206, and outputs the resulting information to the higher layer processing unit 201.

The radio reception unit 2041 converts, by down-converting, a downlink signal received through the antenna 206 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 2041 removes a portion corresponding to CP from the digital signal resulting from the conversion, performs fast Fourier transform on the signal from which CP has been removed, and extracts a signal in the frequency domain.

The frame interpretation unit 2044 interprets the frame configuration included in the signal transmitted from the base station apparatus 1. The frame interpretation unit 2044 can interpret the frame structure in the blind. For example, the frame interpreting unit 2044 may perform a blind detection of at least a position of a resource where information indicating the frame configuration is disposed out of the assigned resources included in the frame configuration, and interpret the frame configuration based on the information transmitted by the resource. For example, the frame interpreting unit 2044 may acquire, by the upper layer signaling such as the RRC signaling, information indicating the frame configuration, or a position of the resource where the information indicating the frame configuration is disposed, or a candidate of a position of the resource where the information indicating the frame configuration is disposed, and based on the information, may interpret the frame configuration, or may blind detect the position of the resource where the information necessary to interpret the frame configuration is disposed.

The demultiplexing unit 2042 demultiplexes the extracted signal into PHICH, PDCCH, EPDCCH, PDSCH, and the downlink reference signal. Further, the demultiplexing unit 2042 makes a compensation of channels including PHICH, PDCCH, and EPDCCH based on a channel estimation value of the desired signal obtained from the channel measurement, detects the downlink control information, and outputs the information to the controller 202. The controller 202 outputs PDSCH and the channel estimation value of the desired signal to the signal detection unit 2043.

The signal detection unit 2043, using PDSCH and the channel estimation value, detects a signal, and outputs the detected signal to the higher layer processing unit 201.

The transmitter 203 generates the uplink reference signal in accordance with the control signal input from the controller 202, codes and modulates the uplink data (the transport block) input from the higher layer processing unit 201, multiplexes with the PUCCH, the PUSCH, and the generated uplink reference signal, and performs a transmission to the base station apparatus 1A through the antenna 206.

The coding unit 2031 codes the uplink control information input from the higher layer processing unit 201 in compliance with a coding scheme, such as convolutional coding or block coding. Furthermore, the coding unit 2031 performs turbo coding in accordance with information used for the scheduling of PUSCH.

The modulation unit 2032 modulates coded bits input from the coding unit 2031, in compliance with the modulation scheme notified with the downlink control information, such as BPSK, QPSK, 16QAM, or 64QAM, or in compliance with a modulation scheme prescribed in advance for each channel.

In accordance with the control signal input from the controller 202, the multiplexing unit 2034 rearranges modulation symbols of PUSCH in parallel and then performs Discrete Fourier Transform (DFT) on the rearranged modulation symbols. Furthermore, the multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to the resource elements for each transmit antenna port. Note that, the uplink reference signal is generated by the transmitter 203 based on a physical cell identity (PCI, also referred to as a cell ID or the like) for identifying the base station apparatus 1A, a bandwidth in which the uplink reference signal is disposed, a cyclic shift notified with the uplink grant, a parameter value for generation of a DMRS sequence, and the like, in accordance with a sequence obtained from a rule (formula) prescribed in advance.

Like the frame configuration unit 1033 included in the base station apparatus 1A, the frame configuration unit 2033 provides the frame format (frame architecture, frame type, frame form, frame pattern, frame generation method, frame definition), or information indicating the frame format, or the frame itself. The operation of the frame configuration unit 2033 will be described later. It is needless to say that the function of the frame configuration unit 2033 may be included in another component (for example, the upper layer processing unit 201).

The radio transmission unit 2035 performs Inverse Fast Fourier Transform (IFFT) on a signal resulting from the multiplexing, performs the modulation of SC-FDMA scheme, generates an SC-FDMA symbol, attaches CP to the generated SC-FDMA symbol, generates a baseband digital signal, converts the baseband digital signal into an analog signal, removes unnecessary frequency components, performs up-conversion to a signal of a carrier frequency, performs power amplification, and performs output to the antenna 206 for transmission.

The signal detection unit 2043 according to the present embodiment is capable of performing a demodulation processing based on the information on the multiplex state of the transmission signal addressed to the apparatus itself and the information on the retransmission state of the transmission signal addressed to the apparatus itself.

Figure 6:
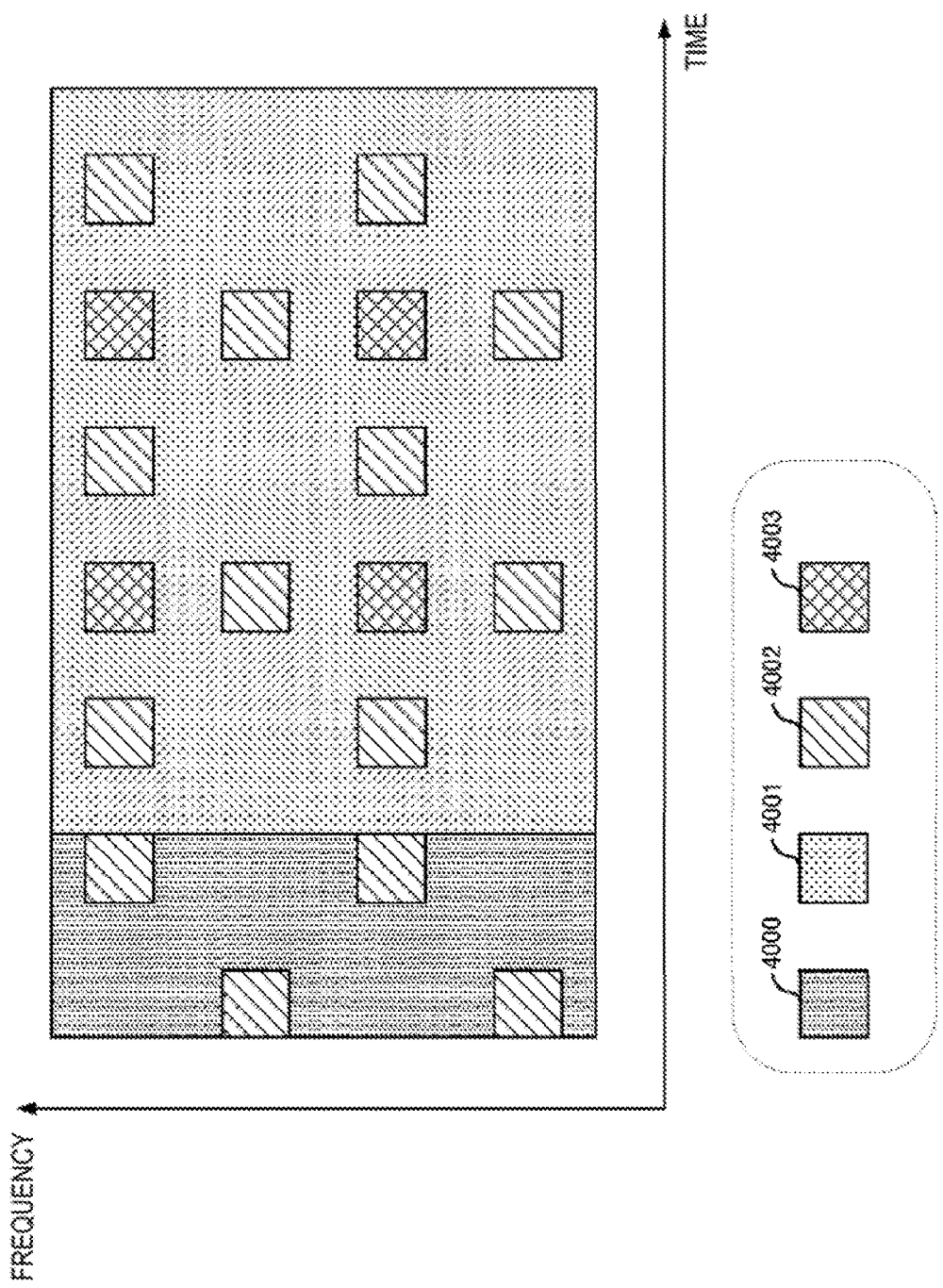
FIG. 6 is a diagram illustrating an example of a frame format according to an aspect of the present invention.

FIG. 6 is a schematic diagram illustrating an example of a frame format (the first frame format, the first frame architecture, the first frame configuration) of a downlink signal generated by the frame configuration unit 1033 according to the present embodiment. As illustrated in FIG. 6, the first frame format includes at least one out of a control signal resource 4000, a data signal resource 4001, a common reference signal (a common RS, a cell specific RS) resource 4002, and a unique reference signal (a unique RS, a reference signal for demodulation, a RS for demodulation, a terminal specific reference signal) resource 4003.

The signal waveform (transmission system) for realizing the frame is not limited to any system, and it may be a multicarrier transmission system typified by OFDM transmission, or a single carrier transmission system typified by SC-FDMA transmission. For example, in the case of OFDM transmission, the first frame format is constituted by a plurality of OFDM signals.

The time length (time period) and the bandwidth of each resource are not limited to anything. For example, the control signal resource 4000 may have 3 OFDM symbol lengths as a time length and 12 subcarriers as a bandwidth.

Figure 7:
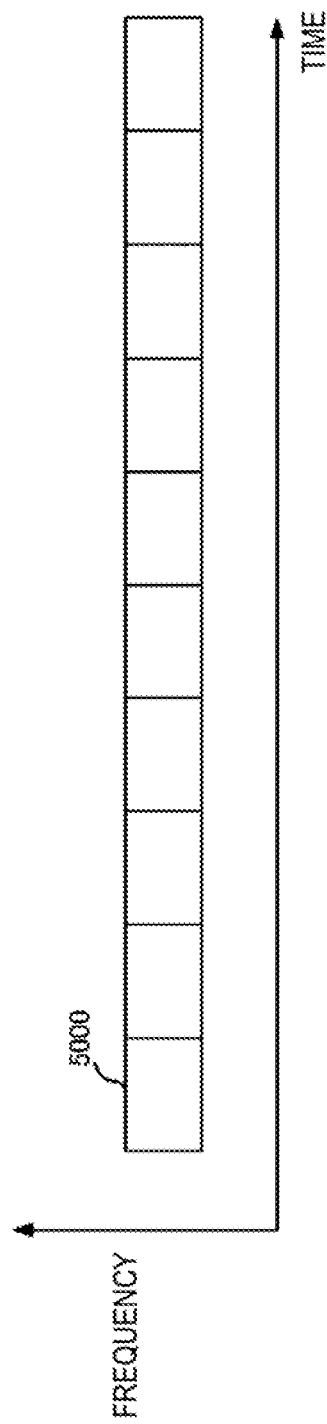
FIG. 7 is a diagram illustrating an example of a frame format according to an aspect of the present invention.

The first frame format can be aggregated in the time direction and the frequency direction. FIG. 7 is a diagram illustrating an example of a frame format generated by the frame configuration unit 1033 according to the present embodiment. In the example of FIG. 7, N subframes 5000 are aggregated in the time direction to form one frame. The subframe 5000 may have a configuration of the first frame format illustrated in FIG. 6. Note that, in the example of FIG. 7, the frequency bandwidth occupied by the frame is the same as the frequency bandwidth of the subframe 5000, but the frame can aggregate the subframes 5000 in the frequency direction. For example, if eight subframes 5000 are arranged in the frequency direction, the frequency bandwidth occupied by the frame is eight times the frequency bandwidth of the subframe 5000. As illustrated in FIG. 7, when a frame is constituted by a plurality of subframes, the frame format illustrated in FIG. 6 is also referred to as a first subframe format, and the frame format illustrated in FIG. 7 is also referred to as a first frame format.

In this embodiment, forming a single frame by bundling a plurality of subframes is referred to as aggregation. However, the frame configuration unit 1033 may define the frame format generated by arranging a plurality of subframes in a plurality of time directions and in a plurality of frequency directions as one frame format from the beginning. Further, the number of bundles in the time direction and/or in the frequency direction may be configured as a parameter, and in this case, this parameter is instructed from the base station apparatus to the terminal apparatus.

Returning to FIG. 6, the control signal resource 4000 includes control information on the downlink signal transmitted from the base station apparatus 1A. The control information is, for example, information that the base station apparatus 1A transmits on the PDCCH. The control information includes common control information broadcast to all terminal apparatuses connected to the base station apparatus 1A, and unique control information individually notified to each terminal apparatus connected to the base station apparatus 1A.

The data signal resource 4001 includes a data signal transmitted from the base station apparatus 1A. The data signal is, for example, information that the base station apparatus 1A transmits on the PDSCH.

In the common RS resource 4002, a common reference signal (common RS, cell-specific reference signal) transmitted to all terminal apparatuses connected to the base station apparatus 1A is disposed. The common RS is used by the terminal apparatus 2A to estimate information (for example, CSI) associated with the reception quality of the own apparatus. The common RS is also used for demodulating the signal transmitted from the terminal apparatus 2A by the control signal resource 4000. The common RS is also used by the terminal apparatus 2A to detect the base station apparatus 1A. In addition, the common RS is also used by the terminal apparatus 2A to perform synchronization processing (sampling synchronization, FFT synchronization) on a signal transmitted from the base station apparatus 1A.

A unique reference signal (unique RS, reference signal for demodulation) individually transmitted to the terminal apparatus 2 connected to the base station apparatus 1A is disposed in the unique RS resource 4003. The unique RS is associated with the data signal addressed to each terminal apparatus that the base station apparatus 1A places in the data signal resource 4001. The terminal apparatus 2A can use the unique RS transmitted to its own apparatus for demodulating the data signal addressed to its own device disposed in the data signal resource 4001.

In the first frame format, as illustrated in FIG. 6, the data signal resource 4001 may include a common RS resource 4002 and a unique RS resource 4003. Further, the frame configuration unit 1033 can have the common RS resources 4002 and the unique RS resources 4003 discretely arranged in the time direction and in the frequency direction. Note that the frame configuration unit 1033 may further include a control signal resource 4000 in the data signal resource 4001. The control signal resource 4000 included in the data signal resource 4001 by the frame configuration unit 1033 is, for example, a resource in which the EPDCCH is disposed, and the resource may be time multiplexed or frequency multiplexed with respect to the resource in which other signals are disposed in the data signal resource 4001.

The frame configuration unit 1033 can further include a synchronization signal resource 4004 and a broadcast signal resource 4007 for the first frame format. A synchronization signal and a broadcast signal notified to the terminal apparatus 2 capable of receiving a signal transmitted from the base station apparatus 1A are disposed in the synchronization signal resource 4004 and the broadcast signal resource 4007. The synchronization signal is a signal for the terminal apparatus 2A to perform an initial synchronization with respect to a signal transmitted from the base station apparatus 1A, and is, for example, a Primary Synchronization Signal (PSS), or a Secondary Synchronization Signal (SSS). The broadcast signal is a signal in which the terminal apparatus 2A acquires system information on the base station apparatus 1A, and includes, for example, information transmitted by the base station apparatus 1A on the PBCH. The frame configuration unit 1033 does not necessarily have to dispose the synchronization signal resource 4004 and the broadcast signal resource 4007 to all subframes.

The base station apparatus 1A can notify (instruct), to the terminal apparatus 2A, the position of a resource to dispose (or a possible candidate resource in which to dispose) the synchronization signal resource 4004 and the broadcast signal resource 4007. Further, the base station apparatus 1A and the terminal apparatus 2A may determine in advance the position of a resource to dispose (or a possible candidate resource in which to dispose) the synchronization signal resource 4004 and the broadcast signal resource 4007. Note that the information indicating the position of a resource includes information such as time resources (subframe number, OFDM signal number, frame number, slot number, and the like), frequency resources (subcarrier number, resource block number, frequency band number, and the like), spatial resources (transmit antenna number, antenna port number, spatial stream number, and the like), and code resources (spread code series, code generation formula, code generation seed, and the like).

In the following description, like the above description, in a case that it is stated that "the base station apparatus 1A notifies information to the terminal apparatus 2A", unless otherwise specified, it includes the status in which the information is shared in advance (or determined in advance) between the base station apparatus 1A and the terminal apparatus 2A. In general, although the overhead is increased by the base station apparatus 1A notifying information to the terminal apparatus 2A, it enables addressing to the ever-changing radio propagation environment. On the other hand, if the base station apparatus 1A and the terminal apparatus 2A share information in advance, the overhead is decreased although addressing to the ever-changing radio propagation environment may become difficult.

Figure 8:
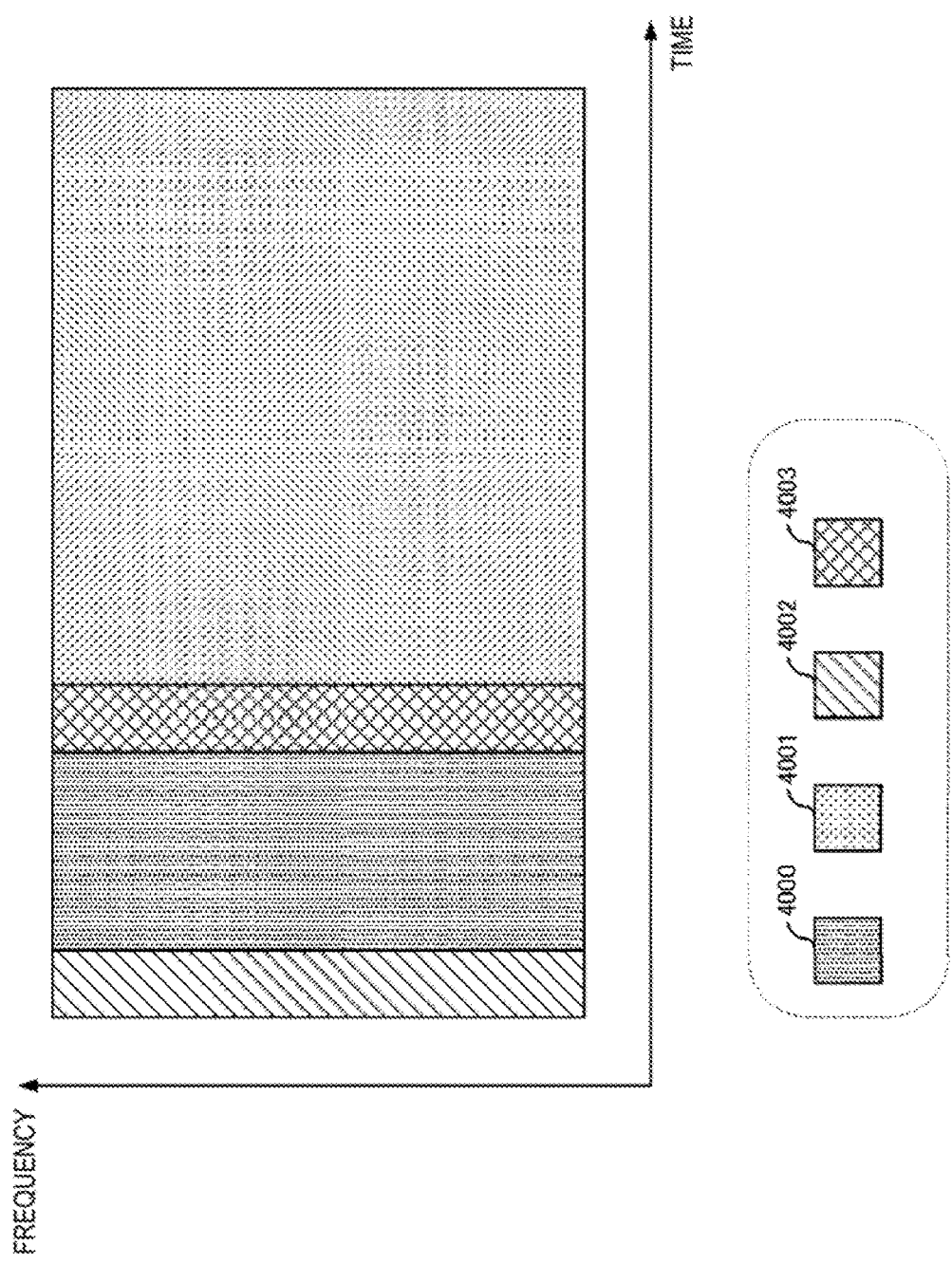
FIG. 8 is a diagram illustrating an example of a frame format according to an aspect of the present invention.

FIG. 8 is a schematic diagram illustrating an example of a frame format (a second frame format, a second frame architecture) of a downlink signal generated by the frame configuration unit 1033 according to the present embodiment. As illustrated in FIG. 8, the second frame format at least includes one out of a control signal resource 4000, a data signal resource 4001, a common RS resource 4002, and a unique RS resource 4003. For example, the second frame format according to the present embodiment may include a configuration that does not include the common RS resource 4002, unlike the example illustrated in FIG. 8.

In the second frame format, the common RS resource 4002 and the data signal resource 4001 are arranged sequentially in time. Additionally, in the second frame format, the common RS resource 4002 and the control signal resource 4000 are disposed in the first half of the frame. Note that, in the example illustrated in FIG. 6, the unique RS resource 4003 is disposed in the first half of the frame, but the frame configuration unit 1033 may include the unique RS resource 4003 in the data signal resource 4001. In a case that the data signal resource 4001 includes the unique RS resource 4003, the frame configuration unit 1033 may have the unique RS resource 4003 discretely disposed in the time direction and in the frequency direction within the range of the data signal resource 4001.

Note that the frame configuration unit 1033 may further include a control signal resource 4000 in the data signal resource 4001. The signal disposed in the control signal resource 4000 provided in the data signal resource 4001 by the frame configuration unit 1033 is, for example, a signal transmitted by the EPDCCH. The control signal resource 4000 may be time-multiplexed or frequency-multiplexed with respect to a resource in which other signals are disposed in the data signal resource 4001.

The terminal apparatus 2A configured to receive the transmission signal generated based on the second frame format is capable of performing initial synchronization processing for the apparatus that transmitted the transmission signal by using the common RS disposed to the common RS resource 4002 disposed in the first half of the frame. Namely, the frame configuration unit 1033 according to the present embodiment may include the synchronization signal resource 4004 in the common RS resource 4002 in the second frame format. In the second frame format, the frame configuration unit 1033 can make resources common to a resource for disposing the common RS resource 4002 and a resource for disposing the synchronization signal resource 4004. The frame configuration unit 1033 can make a part of the common RS disposed in the common RS resource 4002 a synchronization signal.

The frame configuration unit 1033 can either make resources common to a resource to dispose the synchronization signal resource 4004 for the first frame format and a resource to dispose the synchronization signal for the second frame format, or make them different resources. The base station apparatus 1A can either make the synchronization signal transmitted by the synchronization signal resource 4004 disposed in the first frame format, and the synchronization signal transmitted by the synchronization signal resource 4004 disposed in the second frame format as the same signal, or different signals. Here, the same signal includes that at least a part of the information included in the signals or the wireless parameter applied to the signals is common.

In a case that the frame configuration unit 1033 has different resources for allocating the synchronization signal resource 4004 (or the broadcast signal resource 4007) with respect to the first frame format and the second frame format, the receiver 204 of the terminal apparatus 2A may perform the synchronization processing on a plurality of resources with the possibility that the synchronization signal resource 4004 is disposed. Then, the receiver 204 of the terminal apparatus 2A can recognize the frame format of the signal that it is receiving based on the result of the synchronization processing for the plurality of resources. For example, in a case that the receiver 204 of the terminal apparatus 2A performs synchronization processing on resources that may have synchronization signal resources 4004 disposed in the second frame format, and determines that synchronization is established as a result, the receiver 204 of the terminal apparatus 2A can recognize that the frame format of the signal received by its own apparatus is the second frame format. Namely, the terminal apparatus 2A can blindly detect the frame format, and according to the above method, the terminal apparatus 2A can perform blind detection of the frame format by synchronization processing.

The frame configuration unit 1033 can further include the broadcast signal resource 4007 in the second frame format. Similarly to the first frame format, the frame configuration unit 1033 does not need to include the broadcast signal resource 4007 in all of the transmission signals. The resource to which the frame configuration unit 1033 disposes the broadcast signal resource 4007 in the second frame format may be made the same resource as the resource to which the frame configuration unit 1033 has disposed the broadcast signal resource 4007 in the first frame format, or difference resources.

For each frame format, the base station apparatus 1A and the terminal apparatus 2A may determine in advance the resources (or possible resource candidates in which to dispose the resources) in which the synchronization signal resource 4004 and the broadcast signal resource 4007 are disposed. In this case, the base station apparatus 1A can notify the resources or resource candidate groups to the terminal apparatus 2A, by notifying the frame format of the signal transmitted by its own apparatus to the terminal apparatus 2A.

In addition, the base station apparatus 1A can make the information included in a signal transmitted by the broadcast signal resource 4007 disposed for the first frame format and the information included in a signal transmitted in the broadcast signal resource 4007 disposed for the second frame format to be the common information, or information different to each other. Also, the base station apparatus 1A can make the wireless parameters (coding rate, modulation scheme, code length, spreading factor, and the like) of the signal transmitted by the broadcast signal resource 4007 disposed for the first frame format and the wireless parameters of the signal transmitted by the broadcast signal resource 4007 disposed for the second frame format, to be common, or different wireless parameters to each other.

The base station apparatus 1A may notify a resource (or a possible candidate resource) in which the frame configuration unit 1033 disposes the broadcast signal resource 4007 for the second frame format, to the terminal apparatus 2A. The base station apparatus 1A may notify each of the resources in which the frame configuration unit 1033 disposes the broadcast signal resource 4007 for the first frame format, and the resource in which the frame configuration unit 1033 disposes the broadcast signal resource 4007 for the second frame format, separately to the terminal apparatus 2A It is needless to say that it is possible to determine in advance the information on each resource through which the base station apparatus 1A notifies the terminal apparatus 2A between the base station apparatus 1A and the terminal apparatus 2A.

The terminal apparatus 2A connected to the base station apparatus 1A can recognize the frame format of the signal received by its own apparatus by acquiring the information included in the signal transmitted by the broadcast signal resource 4007. Further, in a case that the frame configuration unit 1033 of the base station apparatus 1A changes the resource for disposing the broadcast signal resource 4007 according to the frame format, the receiver 204 of the terminal apparatus 2A may perform the demodulation processing of the broadcast signal with respect to the resource to which there is a possibility that the broadcast signal resource 4007 may be disposed. The terminal apparatus 2A can recognize the frame format of the signal received by its own apparatus based on the information indicating the resource in which the correctly demodulated broadcast signal has been disposed. Namely, the terminal apparatus 2A can perform blind detection of the frame format, and according to the above method, the terminal apparatus 2A can blindly detect the frame format by acquiring the broadcast signal.

Similarly to the first frame format, the frame configuration unit 1033 can define the second frame format by aggregating the subframes in the time direction and in the frequency direction, with the frame format illustrated in FIG. 8 as the second subframe format (the second subframe). In a case of aggregating subframes, the frame configuration unit 1033 can aggregate frames including all of the common RS resource 4002, the control signal resource 4000, the data signal resource 4001, and the unique RS resource 4003, and out of these four resources can aggregate frames including resources of a specific combination. For example, when frames are aggregated, the frame configuration unit 1033 can aggregate only the plurality of data signal resources 4001 to be aggregated.

Figure 9:
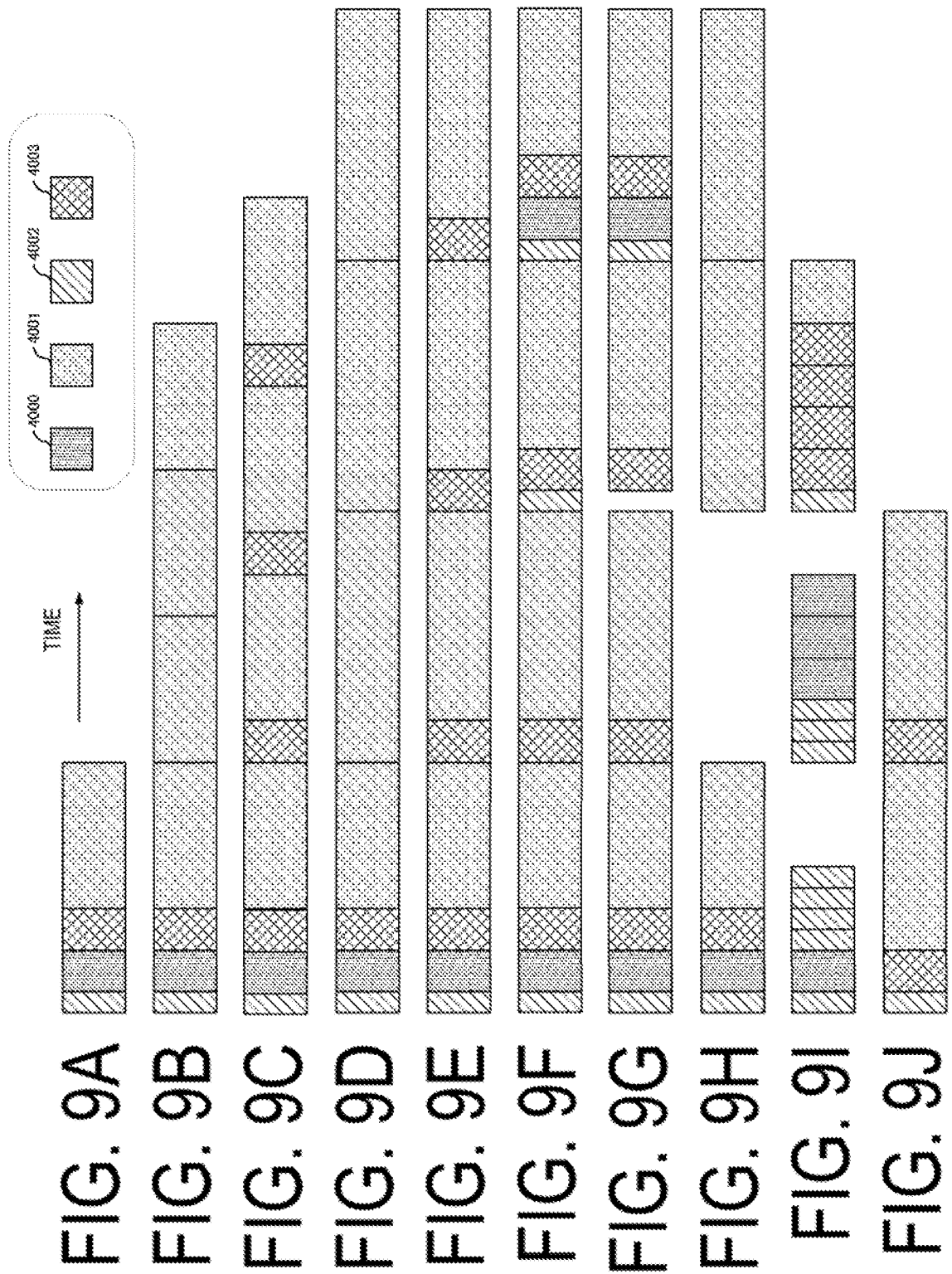
FIGS. 9A to 9J are diagrams, each illustrating an example of a frame format according to an aspect of the present invention.

FIGS. 9A to 9J are schematic diagrams illustrating an example of a frame format (second frame format) of a downlink signal generated by the frame configuration unit 1033 according to the present embodiment. FIG. 9A illustrates a case where aggregation is not performed. As illustrated in FIG. 9B, the frame configuration unit 1033 can aggregate the data signal resources 4001 in the time direction. According to the example of FIG. 9B, the base station apparatus 1A can flexibly change the frame format according to the size of data (payload size) addressed to the terminal apparatus 2A.

As illustrated in FIG. 9C, in addition to the data signal resource 4001, the frame configuration unit 1033 can also aggregate the unique RS resources 4003 in the time direction. According to FIG. 9C, the base station apparatus 1A can place a data signal addressed to a different terminal apparatus 2 to each data signal resource 4001. In addition, since the unique RSs are periodically disposed in the time direction, the base station apparatus 1A can provide stable radio communication to the terminal apparatus 2 under the high-speed mobile environment.

As illustrated in FIG. 9D, the frame configuration unit 1033 can aggregate the data signal resource 4001 in the time direction. Here, the frame length of the data signal resource 4001 to be aggregated may be configured to the frame length with no aggregation (the frame length of the frame illustrated in FIG. 9A). As illustrated in FIG. 9D, even in a case that base station apparatuses located in the vicinity transmit downlink signals to each other based on the second frame format with different aggregation sizes, frame synchronization between the base station apparatuses is easily achieved. Further, as illustrated in FIG. 9E, in addition to the data signal resource 4001, in a case that the unique RS resources 4003 are aggregated in the time direction, the frame lengths of the frames to be aggregated can be equalized.

As illustrated in FIG. 9F, the frame configuration unit 1033 can further aggregate the common RS resource 4002 and the control signal resource 4000 in the time direction. Further, as illustrated in FIG. 9G and FIG. 9H, the frame configuration unit 1033 can provide the non-transmission period (null section) of the base station apparatus 1A in the frame format. The length of the non-transmission period may be the same as the length of the data signal resource 4001 or may be an integer multiple of the element (for example, OFDM signal length) constituting the data signal resource 4001.

As illustrated in FIG. 9I, the frame configuration unit 1033 can also aggregate the control signal resource 4000, the common RS resource 4002, and the unique RS resource 4003. Since the frame configuration unit 1033 aggregates the common RS resource 4002, the transmitter 103 can apply different beam forming to each common RS transmitted with the respective common RS resources. Therefore, for example, the terminal apparatus 2A is enabled to notify the reception quality associated with the plurality of common RSs to the base station apparatus 1A that is connected.

As illustrated in FIG. 9J, the frame configuration unit 1033 can use the second frame format not including the control signal resource 4000, and can also use the second frame format not including the control signal resource 4000 and the common RS resource 4002.

As illustrated in FIG. 9J, in a case that the base station apparatus 1A is transmitting a signal based on the second frame format not including the control signal resource 4000 and the common RS resource 4002, the base station apparatus 1A can transmit the second frame format including the control signal resource 4000 and the common RS resource 4002. For example, the base station apparatus 1A is, while transmitting a signal based on a second frame format not including the control signal resource 4000 and the common RS resource 4002 for a signal transmitted in a high frequency band of 6 GHz or higher, capable of transmitting a signal based on the second frame format including the control signal resource 4000 and the common RS resource 4002 for a signal transmitted in the low frequency band of less than 6 GHz. In this case, the base station apparatus 1A can transmit a signal based on the second frame format that does not include the unique RS resource 4003 or the data signal resource 4001 in the signal transmitted in the low frequency band of less than 6 GHz.

Note that, in a case that the frame forming unit 1033 aggregates a signal generated based on the second frame format in the time direction and the frequency direction, the number of resources included in each signal to be aggregated (for example, the common RS resource 4002 or the data signal resource 4001) may be common or different values. However, from the viewpoint of suppressing the overhead related to signaling from the base station apparatus 1A to the terminal apparatus 2A, it is preferable that the number of resources is associated with the signal length and the frequency bandwidth of the signal to be aggregated. Also, the frame length and the frequency bandwidth of a plurality of frames to be aggregated may be common or may be different from each other. However, from the viewpoint of suppressing overhead related to signaling from the base station apparatus 1A to the terminal apparatus 2A, it is preferable that the relationship between the frame length and the frequency bandwidth between frames is an integral multiple relationship.

Figure 10:
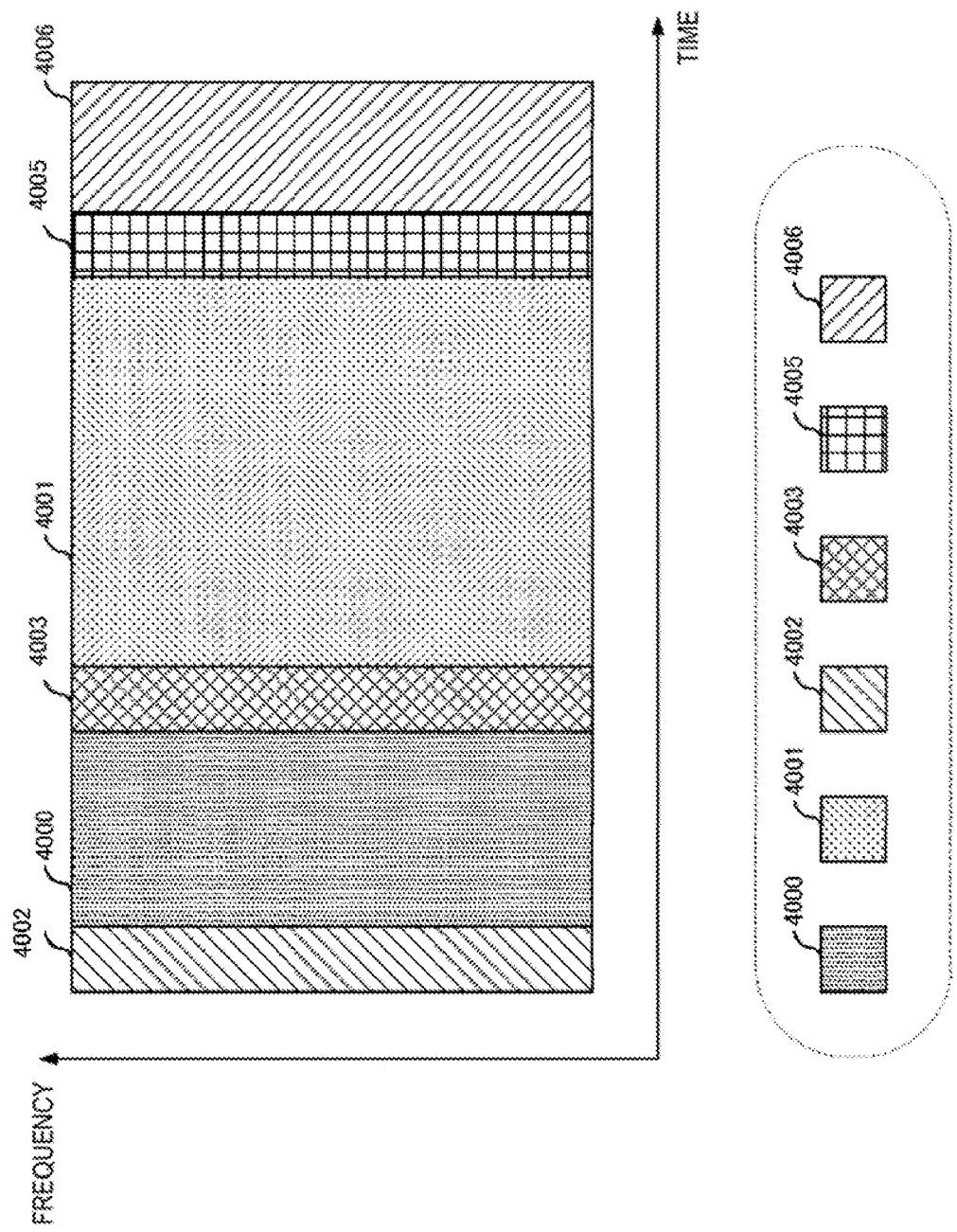
FIG. 10 is a diagram illustrating an example of a frame format according to an aspect of the present invention.

FIG. 10 is a schematic diagram illustrating an example of a frame format according to the present embodiment. As illustrated in FIG. 10, the frame configuration unit 1033 can include the RF switching period 4005 and the uplink signal resource 4006 for the second frame format. The frame format illustrated in FIG. 10 can be used by the base station apparatus 1A and the terminal apparatus 2A that uses time division duplex (TDD) as a duplex scheme. The RF switching period 4005 is a period which the terminal apparatus that has received the signal transmitted by the base station apparatus 1A based on the frame format uses to switch the receiving operation of the terminal apparatus to the transmitting operation. The base station apparatus 1A may set the RF switching period 4005 as a non-transmission period, or may transmit some signal (for example, a common RS). Note that, in order to continuously transmit the frames generated based on the second frame format, the frame configuration unit 1033 may provide the RF switching period 4005 also in the latter half of the uplink signal resource 4006, or it is also possible to configure a non-transmission interval between successively transmitted frames. In a case that the second frame format is used, and in a case that TDD is used, the base station apparatus 1A may configure the RF switching period 4005 and the uplink signal resource 4006 to the second frame format, and in a case that the FDD is used, the base station apparatus 1A can generate the transmission signal based on the respective second frame formats without configuring the RF switching period 4005 and the uplink signal resource 4006 to the second frame format.

Based on the frame format illustrated in FIG. 10, the terminal apparatus 2A that has received the transmission signal transmitted by the base station apparatus 1A, can transmit information (ACK or NACK) indicating whether the data signal disposed in the data signal resource 4001 and addressed to its own apparatus may be received, by disposing it in the uplink signal resource 4006, and transmitting to the base station apparatus 1A. Therefore, since the base station apparatus 1A can grasp immediately whether the data signal addressed to the terminal apparatus 2A is correctly received, it is possible to shorten the delay time related to the transmission of the downlink signal.

The frame configuration unit 1033 can define a plurality of frame formats including a first frame format and a second frame format. Further, the frame configuration unit 1033 can define a plurality of frame formats by changing the wireless parameters of the first frame format and the second frame format. Here, the wireless parameters include part or all of, frequency bandwidth, center frequency, frequency band, subcarrier interval, number of subcarriers, symbol length, FFT/IFFT sampling period, GI length, CP length, frame length, subframe length, slot length, TTI, the number of FFT points, and the type of error correction code to be applied (for example, a turbo code is applied to the first frame format, a low density parity check code is applied to the second frame format, and the like). Also, in a case that different wireless parameters are configured in the same frame format, they are also referred to as different types (modes). For example, in a case of wireless parameters 1 and wireless parameters 2 having different values with respect to the first frame format being configured, they can be referred to as a first frame format type 1 and a first frame format type 2, respectively. Also, the base station apparatus can have a wireless parameter set to which each value included in the wireless parameter is configured in advance. One or more wireless parameter sets can be configured, and the frame configuration unit 1033 can configure different frame format/frame format type by changing the wireless parameter set. In a case that there are a plurality of wireless parameter sets, each wireless parameter set can be configured with a simple rule. For example, in a case that there are three wireless parameter sets, the subcarrier interval of the wireless parameter set 2 may be X times the subcarrier interval of the wireless parameter set 1 (X is an integer of 2 or more), and the subcarrier interval of the wireless parameter set 3 may be Y times the subcarrier interval of the wireless parameter set 2 (X is an integer of 2 or more). Note that some parameters included in each wireless parameter set may be common values. Further, the wireless parameter set is transmitted (instructed) from the base station apparatus to the terminal apparatus. At this time, the terminal apparatus can know the frame format/frame type according to the wireless parameter set received from the base station apparatus. In the following description, unless otherwise specified, the frame format also means the frame format type. Further, whether a terminal is compatible to the above wireless parameter set may be regarded as a capability of the terminal.

The base station apparatus 1A according to the present embodiment can selectively or simultaneously use a plurality of frame formats. Further, the base station apparatus 1A can configure either different wireless parameters selectively, or partially common parameters, for the first frame format and the second frame format. The base station apparatus 1A can notify the terminal apparatus 2A of information indicating the frame format that the base station apparatus 1A uses for the transmission signal. Here, the information indicating the frame format includes information (numerical value, index, indicator) indicating one of a plurality of frame formats defined in advance by the base station apparatus 1A, information indicating resources included in the frame format (for example, information indicating which of the control signal resource 4000, the data signal resource 4001, the common RS resource 4002, and the specific RS resource 4003 is included or not included), information on the resource or its candidate on which each kind of resources is disposed, and the like. The base station apparatus 1A can notify at least a part of the information indicating the frame format to the terminal apparatus 2A by signaling of the PHY layer and notify by the signaling of the upper layer such as RRC signaling and the like.

The base station apparatus 1A can switch and use the frame format according to the use case (or use scenario) in which the base station apparatus 1A provides the communication service. In addition, the base station apparatus 1A can change the wireless parameter of the frame format and use it according to the use scenario in which the apparatus itself provides the communication service.

In order to satisfy a plurality of use scenarios, the base station apparatus 1A according to the present embodiment may provide combinations (sets, collections) of a plurality of frame formats, or combinations (sets, collections) of a plurality of wireless parameter sets configured in frame formats. The base station apparatus 1A may select a frame format according to a use case in which the own apparatus provides a communication service from a frame format set (or a combination of wireless parameter sets) prepared in advance, and generate the transmission signal transmitted by its own apparatus. The frame format set provided by the base station apparatus 1A may be common to or different from the frame format set provided by the other base station apparatuses. Further, the base station apparatus 1A may notify the frame format set provided by its own apparatus to the terminal apparatus 2A connected to the base station apparatus 1A.

In order to satisfy a plurality of use scenarios, the base station apparatus 1A according to the present embodiment can switch and select a plurality of transmission modes. Here, the transmission mode is defined by a combination of a wireless parameter, a multiplexing method, a scheduling method, a precoding method, and the like that the transmitter 103 of the base station apparatus 1A can use in a case of generating a transmission signal. A frame format can be assigned to each of the plurality of transmission modes. It should be noted that the frame format/wireless parameter assigned to the plurality of transmission modes may be different from each other or may be common in part. In this case, the base station apparatus 1A can selectively use a plurality of frame formats/wireless parameters by selecting the transmission mode.

The base station apparatus 1A may uses a plurality of frame formats selectively or simultaneously for Enhanced mobile broadband (EMBB), Enhanced Massive machine type communication (EMTC), and Ultra-reliable and low latency communication (URLLC) as three use scenarios. Further, the base station apparatus 1A can use the second frame format having different wireless parameters for each of EMBB, EMTC, and URLLC. The frame configuration unit 1033 can select a frame format and determine wireless parameters to be set in the frame format in accordance with the use scenario in which the base station apparatus 1A provides the communication service.

For example, the base station apparatus 1A can generate a frame based on the first frame format for the downlink signal related to the EMBB, and generate a frame based on the second frame format for the downlink signals related to the MMTC and the URLLC. In this method, the base station apparatus 1A switches the frame format according to the use case (or use scenario) in which the base station apparatus 1A provides the communication service. However, in the method according to the present embodiment, the frame format is not necessarily limited to the frame format being defined for each use case.

The base station apparatus 1A can selectively use a plurality of frame formats/wireless parameters selectively or simultaneously based on a wireless medium in which the base station apparatus 1A transmits a downlink signal. Here, the wireless medium can include radio resources such as time resources and frequency resources. Further, the wireless medium may include a wireless resource distinguished by a duplex scheme applied to a frequency band in which the base station apparatus 1A transmits a downlink signal.

Further, the wireless medium can include radio resources to be distinguished according to the use case (or use scenario) in which the base station apparatus 1A provides the communication service. The base station apparatus 1A can select the wireless medium to be used according to the use case (or use scenario) that provides the communication service. The base station apparatus 1A can determine in advance a wireless medium to be used for providing the communication service to each use case (or use scenario). Therefore, the wireless medium and the use case are associated with each other, and the base station apparatus 1A may use a plurality of frame formats/wireless parameters selectively or simultaneously based on which wireless medium to be used is associated with which use case (or use scenario).

The base station apparatus 1A may notify information indicating a plurality of frame formats/wireless parameters it uses selectively or simultaneously, based on the wireless medium in which its own apparatus transmits a downlink signal, to the terminal apparatus 2A by a higher layer signaling such as the PHY layer/MAC layer or RRC signaling and the like. It should be noted that the base station apparatus 1A does not need to notify all of the information indicating the plurality of frame formats/wireless parameters described above to the terminal apparatus 2A, and for example, the base station apparatus 1A may notify the said plurality of frame format/wireless parameter candidates to the terminal apparatus 2A. The terminal apparatus 2A may be signaled by the base station apparatus 1A with information indicating a plurality of frame formats/wireless parameters that the base station apparatus 1A selectively or simultaneously uses based on the wireless medium, or may also blind detect some of the information. Note that, the terminal apparatus 2A may notify the information on the plurality of frame formats/wireless parameters receivable by its own apparatus to the base station apparatus 1A.

The base station apparatus 1A can use a plurality of frame formats/wireless parameters selectively or simultaneously according to the frequency (frequency band, channel) at which downlink signals are transmitted. For example, the base station apparatus 1A can divide frequencies at which downlink signals can be transmitted into a plurality of groups. For example, the base station apparatus 1A may set the frequency of less than 6 GHz (Below 6 GHz) as the frequency band 1, the frequency of 6 GHz or more (Above 6 GHz) as the frequency band 2, and may select the frame format between the case of transmitting the downlink signal in the frequency band 1, and the case of transmitting the downlink signal in the frequency band 2. Also, the base station apparatus 1A may generate a transmission signal based on the frame format defined in each frequency band, in a case of transmitting the downlink signal in each frequency band, setting the frequency less than 2 GHz as the frequency band 1, the frequency of 2 GHz or more and less than 6 GHz as the frequency band 2, and the frequency of 6 GHz or more as the frequency band 3.

Figure 11:
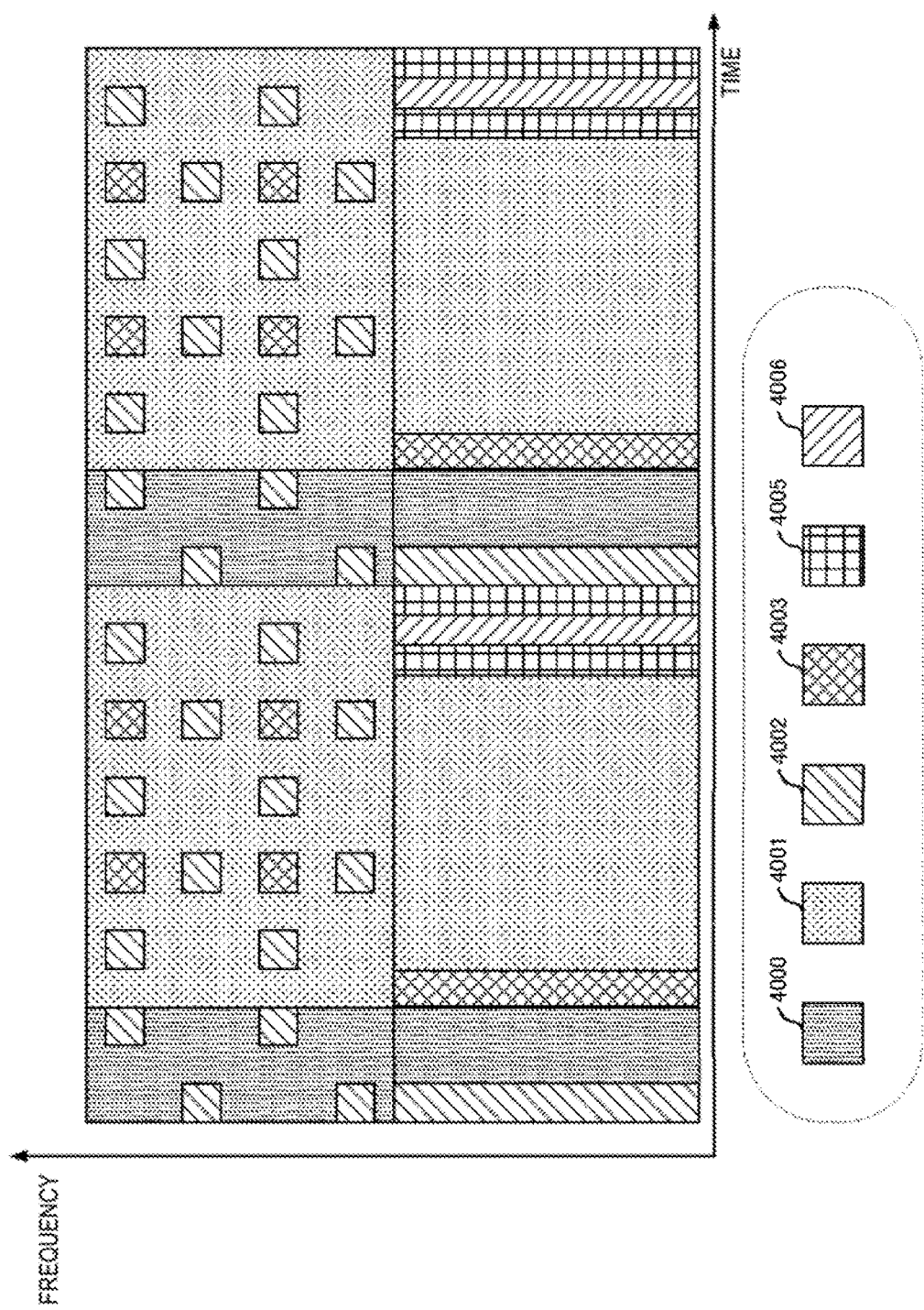
FIG. 11 is a diagram illustrating an example of a frame format according to an aspect of the present invention.

The base station apparatus 1A can simultaneously transmit signals generated based on different frame formats/wireless parameters. FIG. 11 is a schematic block diagram illustrating an example of a configuration of downlink signal transmitted by the base station apparatus 1A according to the present embodiment. According to the example of FIG. 11, the base station apparatus 1A uses different frame formats according to frequencies. The base station apparatus 1A can mix a plurality of different frame formats in one OFDM signal. For example, a plurality of subcarriers constituting one OFDM signal are divided into a plurality of subcarrier groups, and transmission signals disposed in each subcarrier group are generated based on different frame formats. According to the example of FIG. 11, the second frame format includes an RF switching period 4005 and an uplink signal resource 4006. Therefore, the base station apparatus 1A can generate a signal based on the first frame format and a signal based on the second frame format with different OFDM signals, frequency multiplex the different OFDM signals, and simultaneously transmit the same.

According to the example of FIG. 11, although the subcarrier group generated based on the first frame format and the subcarrier group generated based on the second frame format are adjacent to each other, the frame configuration unit 1033 can also dispose a guard band (null subcarrier, no transmission frequency) between each subcarrier group. Further, according to the example of FIG. 11, between the subcarrier group generated based on the first frame format and the subcarrier group generated based on the second frame format, the frame lengths of the signal transmitted are the same but the frame length of each signal does not need to be the same. However, from the viewpoint of synchronization in the wireless network, it is preferable that the relationship of the frame length of the signals transmitted in each subcarrier group is an integer multiple relationship.

Further, the transmitter 103 of the base station apparatus 1A can generate a filtered OFDM signal to which a filter is applied for each subcarrier or for each subcarrier group constituted by a plurality of subcarriers. Filtered OFDM can be, for example, Filter bank multicarrier or Filtered OFDM. In the filtered OFDM, interference between subcarriers (or between subcarrier groups) is greatly suppressed. The base station apparatus 1A can assign different frame formats to a plurality of subcarrier groups generated by its own apparatus. For example, the transmitter 103 of the base station apparatus 1A can generate the first subcarrier group based on the first frame format, generate the second subcarrier group based on the second frame format, and generate the filtered OFDM signal including the first subcarrier group and the second subcarrier group.

The base station apparatus 1A can define a frame format for each duplex method. For example, the base station apparatus 1A can define different frame formats in the case of FDD and the case of TDD. In the case of FDD, the base station apparatus 1A can generate a transmission signal based on the first frame format, while in the case of TDD, it can generate a transmission signal based on the second frame format.

Also, the base station apparatus 1A can selectively use a plurality of frame formats in one duplex method. For example, in the case where the FDD is used as the duplex scheme, the base station apparatus 1A can selectively use the first frame format and/or the second frame format selectively or simultaneously. Further, the base station apparatus 1A can selectively or simultaneously use a plurality of wireless parameters for the first frame format (or the second frame format) in one duplex method.

Further, the base station apparatus 1A can use a duplex method in which FDD and TDD coexist, and the base station apparatus 1A can define a frame format for a duplex method in which FDD and TDD coexist. Further, in the duplex scheme in which FDD and TDD coexist, the base station apparatus 1A can use a plurality of frame formats or wireless parameters selectively or simultaneously. As a duplex scheme in which FDD and TDD coexist, the base station apparatus 1A can use a duplex scheme in which FDD and TDD are temporally switched in frequency bands. As a duplex scheme in which FDD and TDD coexist, the base station apparatus 1A can use Full duplex (or Simultaneous transmission and reception (STR)) which simultaneously performs uplink transmission and downlink transmission. In the STR, the base station apparatus 1A and the terminal apparatus 2A can simultaneously transmit transmission signals generated based on different frame formats.

For the wireless parameters to be set in the first frame format and the second frame format, the base station apparatus 1A may configure a different wireless parameter depending on whether the frequency band is so-called licensed band for which the wireless service provider obtained a use permission (license) from the country or region (licensed band), or a so-called unlicensed band that does not require a permission from the country or region (unlicensed band).

For the wireless parameters to be set in the first frame format and the second frame format, in a case that the frequency band for transmitting the transmission signal to be generated based on each frame format is an unlicensed band, the base station apparatus 1A can change the wireless parameter to configure according to the frequency band of the license band. For example, the base station apparatus 1A can change wireless parameters between a case in which the unlicensed band that transmits the transmission signal is in the 5 GHz band and in a case in which it is in the 60 GHz band.

The base station apparatus 1A can use the frame format obtained by extending the occupied frequency bandwidth of the frame format used in the unlicensed band of the 5 GHz band to an integral multiple for the unlicensed band of the 60 GHz band. Further, the base station apparatus 1A can bundle a plurality of transmission signals generated in a frame format used for a license band of 6 GHz or more in the frequency direction and use it for an unlicensed band of 60 GHz band. The base station apparatus 1A, on its own or in collaboration with other base station apparatus, can transmit component carriers generated based on a frame format used for a license band of 6 GHz or higher using CA (Carrier Aggregation) and DC (Dual Connectivity), transmitting a plurality of component carriers simultaneously disposed in the unlicensed band of the 60 GHz to the terminal apparatus 2A.

In the unlicensed band of the 60 GHz band, the base station apparatus 1A can use the same bandwidth as the bandwidth (for example, 2 GHz or 2.16 GHz) of the channel defined by IEEE 802.11 ad, or the bandwidth that is an integral multiple of the bandwidth frame format. Further, the base station apparatus 1A can use the frame format in which integer multiples (including equal magnification) of the frequency bandwidth coincides with the bandwidth of the channel defined in IEEE 802.11 ad as an unlicensed band in the 60 GHz band, or licensed band of above 6 GHz.

The base station apparatus 1A can configure different wireless parameters between a case where a frequency band in which a transmission signal to be generated based on each frame format and transmitted is the occupied frequency band that can be occupied by one radio carrier, or the shared frequency band (Shared band) shared by a plurality of radio carriers.

The base station apparatus 1A can arrange a plurality of transmission signals generated based on different frame formats in the frequency direction. In a case where a plurality of transmission signals generated based on different frame formats are disposed in the frequency direction, the base station apparatus 1A can transmit the plurality of transmission signals at the same time using a carrier aggregation (CA) that aggregates and transmits a plurality of component carriers (CC). Note that a plurality of CCs transmitted by the carrier aggregation can be transmitted from a plurality of different base station apparatuses. In carrier aggregation, one primary cell (PCell) and one or more secondary cells (SCell) are configured as an aggregation of serving cells.

The base station apparatus 1A can use different frame formats/wireless parameters for a plurality of CCs transmitted by CA. For example, in a case that the base station apparatus 1A performs CA transmission of 2 CC, the first frame format is applied to the first CC and the second frame format can be applied to the second CC. In addition, the base station apparatus 1A can generate the transmission signal to be transmitted by each CC based on the second frame format in which different wireless parameters are configured. Namely, the base station apparatus 1A can configure a frame format/wireless parameter for each cell. For example, the base station apparatus 1A can communicate in the first frame format in the PCell/SCell and communicate in the second frame format in the SCell. Also, the base station apparatus 1A communicates with the PCell and the SCell in the second frame format, but the wireless parameters to be set can be different for each cell.

The base station apparatus 1A can include information indicating the frame format configured in the CC as the secondary cell in the control information disposed in the control signal resource 4000 included in the CC as the primary cell.

In a case where a plurality of transmission signals generated based on different frame formats are disposed in the frequency direction, the base station apparatus 1A has a dual connectivity (DC) that transmits signals simultaneously from a plurality of transmission points in cooperation with other base station apparatuses. In DC, a master cell group (MCG) and a secondary cell group (SCG) are configured as a group of serving cells. The MCG is constituted by a PCell and optionally one or more SCells. In addition, the SCG is constituted by a primary SCell (PSCell) and optionally one or more SCells. For example, in a case that the base station apparatus 1A and the base station apparatus 1B transmit the downlink signal to the terminal apparatus 2A by DC, the base station apparatus 1A and the base station apparatus 1B can generate and transmit the signal based on frame format/wireless parameter different to each other. Also, in a case that the base station apparatus 1A and the base station apparatus 1B transmit a downlink signal to the terminal apparatus 2A by DC, the base station apparatus 1A and the base station apparatus 1B can respectively generate and transmit the signals based on the second frame format on which different wireless parameters are configured. In other words, the base station apparatus 1A can configure a frame format/wireless parameter for each cell. For example, different frame formats are configured for PCell and PSCell, and different frame formats are configured for PCell/PSCell and SCell. Also, the base station apparatus 1A/1B can configure the second frame format in which different wireless parameters are configured for PCell and PSCell.

The base station apparatus 1A can notify the terminal apparatus 2A of the information on the frame format/wireless parameter configured for each of a plurality of downlink signals disposed in the frequency direction. In the case of CA or DC, the base station apparatus 1A can transmit the information on the frame format/wireless parameter configured for each cell to the terminal apparatus 2A.

The base station apparatus 1A can arrange a plurality of transmission signals generated based on different frame formats/wireless parameters in the spatial direction. For example, in a case that the base station apparatus 1A simultaneously transmits the downlink signals to the terminal apparatus 2A and the terminal apparatus 2B by multi-user multiple input multiple output transmission (MU-MIMO), the base station apparatus 1A can generate transmission signals addressed to the terminal apparatus 2A and transmission signals addressed to the terminal apparatus 2B based on different frame formats and transmit the transmission signals spatially multiplexing and transmitting the two transmission signals. Namely, the transmission signals transmitted by the base station apparatus 1A according to the present embodiment can be spatially multiplexed with transmission signals generated based on different frame formats in the spatial direction.

In a case that base station apparatus 1A multiplexes transmission signals generated based on different frame formats in the spatial direction, base station apparatus 1A can allocate at least a part of the resources in which unique RS resources 4003 are disposed common with respect to each frame format.

Further, in a case that the terminal apparatus 2A has the function of eliminating or suppressing inter-user interference or adjacent cell interference, the base station apparatus 1A can transmit assist information for eliminating or suppressing inter-user interference or adjacent cell interference. Assist information (adjacent cell information) includes physical cell ID, number of CRS ports, PA list, PB, MBSFN (Multimedia Broadcast multicast service Single Frequency Network) subframe setting, transmission mode list, resource allocation granularity, TDD UL/DL subframe configuration, ZP/NZP CSI-RS configuration, QCL (quasi co-location) information, frame format, wireless parameters. PA is information based on a transmit power ratio (power offset) of PDSCH and CRS in an OFDM symbol where CRS is not allocated. PB represents the power ratio (power offset) of the PDSCH in the OFDM symbol in which the CRS is arranged and the PDSCH in the OFDM symbol in which the CRS is not arranged. The QCL information is information on a predetermined antenna port, a predetermined signal, or QCL for a predetermined channel. In the two antenna ports, if long-range characteristics of the channel carrying symbols on one antenna port can be inferred from the channel carrying symbols on the other antenna port, those antenna ports are QCL. Long-term characteristics include delay spread, Doppler spread, Doppler shift, average gain and/or average delay. Namely, if the two antenna ports are QCL, the terminal apparatus can be regarded as having the same long-term characteristics at those antenna ports. In each of the parameters included in the above-described assist information, one value (candidate) may be configured, or multiple values (candidates) may be configured. In the case of multiple values being configured, the terminal apparatus interprets that the value possibly configured by the interfering base station apparatus as being indicated for that parameter, and the parameter configured as interference signal from the multiple values are detected (specified). Further, the above assist information may indicate information of another base station apparatus/beam, or may indicate information of its own base station apparatus/beam. In addition, the above assist information may be used in a case that various types of measurement are carried out. The measurement includes Radio Resource Management (RRM) measurement, Radio Link Monitoring (RLM), and Channel State Information (CSI) measurement.

The antenna directivity pattern formed by the antenna 105 of the base station apparatus 1 according to the present embodiment can be determined based on the frame configuration configured by the frame configuration unit 1033. In a case where the antenna 105 is capable of forming a plurality of antenna directivity patterns, the antenna 105 can associate the plurality of antenna directivity patterns with each of a plurality of frame configurations configurable by the frame configuration unit 1033. For example, in a case that the frame configuration unit 1033 can configure two frame configurations (first frame configuration and second frame configuration) having different subcarrier intervals, the antenna 105 can configure an antenna directivity pattern configurable in a case that the frame configuration unit 1033 configures a first frame configuration, and configure an antenna directivity pattern configurable in a case that the frame configuration unit 1033 configures a second frame configuration, respectively. In this case, based on the frame configuration configured by the frame configuration unit 1033, the antenna 105 can determine the selectable antenna directivity pattern. The antenna directivity pattern configured for each frame configuration by the antenna 105 may be single or plural. In addition, the antenna directivity pattern configured for each frame configuration of the antenna 105 may be exclusively configured for each frame configuration (the antenna directivity pattern that the antenna 105 can configure for each frame configuration is different), or may be configured partially common (a part of the antenna directivity pattern that the antenna 105 can configure for each frame configuration is common).

By being controlled in this manner, the base station apparatus 1 according to the present embodiment can configure (define, select) the antenna directivity pattern for each frame configuration, thereby enabling the frame configuration unit 1033 to configure an appropriate antenna directivity pattern for each frame structure in a case that the frame configuration unit 1033 configures plural frame configurations. For example, in a case that the frame configuration unit 1033 determines the frame configuration based on the carrier frequency, the base station apparatus 1 according to the present embodiment is capable of selecting an antenna directivity pattern suitable for the carrier frequency at which the frame configuration is used.

The beam sweeping unit 1061 of the base station apparatus 1 according to the present embodiment can perform beam sweeping on the antenna directivity pattern of the antenna 105 based on the frame configuration configured by the frame configuration unit 1033. The beam sweeping unit 1061 can perform beam sweeping for each frame configuration. For example, the beam sweeping unit 1061 can transmit signals (for example, reference signals) with different antenna directivity patterns in different radio resources for each frame structure. The terminal apparatus 2 can measure the information indicating the reception quality of the received signal for each frame structure and notify the base station apparatus 1. The base station apparatus 1 can acquire the appropriate antenna directivity pattern for each frame configuration by acquiring the information indicating the reception quality notified from the terminal apparatus 2 for each frame configuration.

The method by which the terminal apparatus 2 transmits information on the measured reception quality to the base station apparatus 1 is not limited to anything. In the terminal apparatus 2, the beam sweeping unit 1061 of the base station apparatus 1 may transmit the information on the reception quality at the carrier frequency at which beam sweeping is being performed, or may transmit the information on the reception quality at the carrier frequency different from the carrier frequency to transmit the information on the reception quality. Further, the terminal apparatus 2 may notify the information (for example, information on the reception quality for each antenna directivity pattern as described above) on the antenna directivity pattern of the base station apparatus 1 measured based on a signal having a predetermined frame configuration, by using a signal having a frame configuration other than the predetermined frame configuration to notify the base station apparatus 1.

The beam sweeping unit 1061 of the base station apparatus 1 according to the present embodiment can perform beam sweeping on the antenna directivity pattern of the antenna 105 in a case that the frame configuration configured by the frame configuration unit 1033 is a predetermined frame configuration. In the base station apparatus 1, for example, in a case that the frame configuration unit 1033 can configure two frame configurations (first frame configuration and second frame configuration) with different subcarrier intervals, the beam sweeping unit 1061 can perform the beam sweeping on the antenna directivity pattern of the antenna 105 only in the case in which the frame configuration unit 1033 configures the first frame configuration.

The terminal apparatus 2 according to the present embodiment is configured such that in a case that the frame interpreting unit 2044 interprets the frame configuration included in the signal transmitted from the base station apparatus 1 as a predetermined frame configuration, the terminal apparatus 2 performs operations associated with beam sweeping of the beam sweeping unit of the base station apparatus 1. For example, in a case that the frame interpreting unit 2044 interprets the frame configuration of the signal transmitted from the base station apparatus 1 as a predetermined frame configuration, the receiver 204 can measure the reception quality of the signal transmitted from various radio resources. At this time, the base station apparatus 1 can transmit signals to be transmitted with different radio resources using different antenna directivity patterns. Further, the base station apparatus 1 and the terminal apparatus 2 can share in advance radio resources on which the base station apparatus 1 disposes signals to be transmitted with different antenna directivity patterns, and the base station apparatus 1 can also provide the information indicating such radio resource to the terminal apparatus 2 by signaling. Therefore, the terminal apparatus 2 can measure the reception quality of the different radio resources and notify the information on the reception quality (the reception quality value, the information indicating the radio resource with the best reception quality, the information indicating the radio resource with the poorest reception quality, and he like) to the base station apparatus 1. Namely, the antenna 206 of the terminal apparatus 2 according to the present embodiment, in a case that the frame configuration included in the signal transmitted from the base station apparatus 1 is a predetermined frame configuration, is capable of performing an operation to detect the plurality of beams transmitted by the base station apparatus 1.

The predetermined frame configuration for the beam sweeping unit 1061 to perform beam sweeping is not limited by anything. For example, in a case that the subcarrier interval of the frame configuration configured by the frame configuration unit 1033 is equal to or longer than a predetermined interval or the maximum interval, the beam sweeping unit 1061 can perform the beam sweeping on the antenna directivity pattern of the antenna 105. For example, in a case that a predetermined resource allocation is made to the frame configuration configured by the frame configuration unit 1033 (for example, in a case that a common RS resource is allocated, if a unique RS resource is allocated, if a plurality of common or unique RS resources are allocated), the beam sweeping unit 1061 is possible to perform beam sweeping on the antenna directivity pattern of the antenna 105. It should be noted that the predetermined frame configuration may be a single frame structure or a plurality of frame structures.

The beam sweeping unit 1061 can select whether to conduct analog beam forming, digital beam forming, or both based on the frame configuration in a case of performing beam sweeping related to hybrid beam forming. For example, the beam sweeping unit 1061 can perform only analog beam forming in a predetermined frame configuration, and can perform only digital beam forming except for the predetermined frame configuration. Similarly, the beam sweeping unit 1061 may perform both digital beam forming and analog beam forming in a predetermined frame configuration, and may perform only digital beam forming in the frames except for the predetermined frame configuration Here, the predetermined frame configuration is not limited to anything, but for example, the predetermined frame configuration can be a frame configuration with a wider subcarrier interval than other frame configurations.

The base station apparatus 1 can notify the terminal apparatus 2 of information indicating a predetermined frame configuration in which the beam sweeping unit 1061 performs beam sweeping. The base station apparatus 1 can notify the terminal apparatus 2 of the information indicating the predetermined frame configuration as the control information of the physical layer such as the PDCCH. The base station apparatus 1 can notify the terminal apparatus 2 of the information indicating the predetermined frame configuration using the frame having the predetermined frame configuration. The base station apparatus 1 can notify the terminal apparatus 2 of the information indicating the predetermined frame configuration by signaling of an upper layer such as RRC signaling.

In the terminal apparatus 2, only by receiving information indicating a predetermined frame configuration for beam sweeping from the base station apparatus 1, for the frame interpretation unit 2044 of the terminal apparatus 2, the frame configuration included in the signal transmitted from the base station apparatus 1 is the predetermined frame configuration indicated by the information, the antenna 206 can perform the beam detection.

The beam sweeping unit 1061 can perform beam sweeping on the antenna directivity pattern of the antenna 105 within a predetermined time period. The unit of the predetermined time period may be defined as an absolute time such as millisecond, or may be a unit of frame (subframe unit, symbol unit) of a frame configuration configured by the frame configuration unit 1033. It should be noted that the predetermined time period may be configured by the base station apparatus 1 as a measurement restriction (Measurement Restriction). The length of the predetermined time period in which the beam sweeping unit 1061 according to the present embodiment performs beam sweeping may be common in a plurality of frame configurations configured by the frame configuration unit 1033 or may be different lengths.

The beam sweeping unit 1061 can perform beam sweeping on a plurality of antenna directivity patterns within the predetermined time period. Although the beam sweeping method is not limited to anything, for example, the antenna 105 of the base station apparatus 1 may form different antenna directivity patterns in different radio resources within the predetermined time period, and transmit a signal (for example, a reference signal) to the terminal apparatus 2.

For example, the antenna 105 of the base station apparatus 1 may receive a plurality of signals (for example, reference signals) transmitted from the terminal apparatus 2 in different antenna directivity patterns within the predetermined time period, and measure the reception quality.

The number of antenna directivity patterns of the beam sweeping that the beam sweeping unit 1061 performs according to the present embodiment in a predetermined time section (in the above example, the number of antenna directivity patterns in which the antenna 105 transmits the signal within the predetermined time section or the number of signals transmitted from the terminal apparatus 2 received by the antenna 105) can be determined based on the frame configuration configured by the frame configuration unit 1033. For example, the number of antenna directivity patterns of beam sweeping that the beam sweeping unit 1061 can perform according to the present embodiment within the predetermined time period can be configured to different values for each frame configuration configured by the frame configuration unit 1033.

For example, in a case that the frame configuration unit 1033 can configure two frame configurations (first frame configuration and second frame configuration) having different subcarrier intervals, and the subcarrier interval of the first frame configuration is longer than the subcarrier interval of the second frame configuration, the number of antenna directivity patterns in which the beam sweeping unit 1061 performs beam sweeping within the predetermined time period in the first frame configuration can be made longer than the number of antenna directivity patterns in which the beam sweeping unit 1061 performs beam sweeping within the predetermined time period in the second frame configuration.

The terminal apparatus 2 can perform operations related to a plurality of antenna directivity patterns configured by the antenna 105 of the base station apparatus 1 within a predetermined time period. For example, the terminal apparatus 2 can transmit a plurality of reference signals within the predetermined time period. By using the plurality of reference signals, the base station apparatus 1 can measure the reception quality of the plurality of antenna directivity patterns of the antenna 105 within the predetermined time period. The number of the reference signal which the terminal apparatus 2 transmits within the predetermined time period, may be determined based on the frame configuration included in the transmitted signal transmitted by the base station apparatus 1 and interpreted by the frame interpretation unit 2044, or determined based on the frame configuration of the reference signal configured by the frame configuration unit 2033.

In addition, the terminal apparatus 2 can measure the reception quality of the signals transmitted by the base station apparatus 1 with different antenna directivity patterns in different radio resources within a predetermined time period. The number of radio resources for which the terminal apparatus 2 measures the reception quality within the predetermined time period may be determined based on the frame configuration of the signal transmitted by the base station apparatus 1 interpreted by the frame interpretation unit 2044.

The method described above, basically, has been explained based on an example in which the base station apparatus 1 transmits a signal to the terminal apparatus 2, and the antenna directivity pattern formed by the antenna 105 is controlled by the beam sweeping unit 1061. According to the above-described method, the beam sweeping unit 1061 can also scan the antenna directivity pattern formed by the antenna 105 in a case that the base station apparatus 1 receives a signal from the terminal apparatus 2. It should be noted that the terminal apparatus 2 can transmit a signal (for example, a reference signal) for beam sweeping according to an instruction or configuration from the base station apparatus 1.

In addition, although the frame configuration unit 1033 according to the present embodiment can configure the frame configuration for each carrier frequency (frequency band), the beam sweeping unit 1061 can configure the antenna directivity pattern configured to the predetermined frequency band also at the frequency band other than the predetermined frequency band. For example, in a case that the frame configuration unit 1033 configures the common frame configuration to the first frequency band and the second frequency band, the beam sweeping unit 1061 may perform beam sweeping at the first frequency band (or the second frequency band), and use the antenna directivity pattern of the antenna 105 configured by the beam sweeping can be used as the antenna directivity pattern of the antenna 105 in the second frequency band (or the first frequency band).

Further, the antenna 206 of the terminal apparatus 2 according to the present embodiment can perform a part of the operation of the antenna 105 included in the base station apparatus 1. Namely, the antenna 206 according to the present embodiment can have the same device configuration as the antenna 105. In this case, of course, the antenna 206 can perform analog beam forming, digital beam forming and hybrid beam forming similarly to the antenna 105. The terminal apparatus 2 according to the present embodiment can include a beam sweeping unit 2061 similarly to the beam sweeping unit 1061 of the base station apparatus 1. Like the beam sweeping unit 1061, the beam sweeping unit 2061 can control the antenna directivity pattern of the antenna 206. The number of antenna directivity patterns that can be scanned by the beam sweeping unit 2061 is not necessarily the same as the number of antenna directivity patterns that the beam sweeping unit 1061 can scan. Similarly, the base station apparatus 1 can perform beam detection operation related to beam sweeping performed by the beam sweeping unit 2061 of the terminal apparatus 2. The beam detection operation performed by the base station apparatus 1 is the same as the beam detection operation performed by the terminal apparatus 2 on the antenna directivity pattern of the antenna 105 of the base station apparatus 1, but similarly to the relationship between the beam sweeping unit 2061 and the beam sweeping unit 1061, for example, it is included in the method of this embodiment where the number of antenna directivity patterns that can be beam swept when the base station apparatus 1 performs the beam sweeping and is different from the number of antenna directivity patterns that can be beam swept when the terminal apparatus 1 performs the beam sweeping.

In a case that the information indicating the frame configuration notified from the base station apparatus 1 indicates a predetermined frame configuration, the beam sweeping unit 2061 can perform beam sweeping on a plurality of antenna directivity patterns configurable by the antenna 206. The terminal apparatus 2 can acquire the information indicating the predetermined frame configuration from the base station apparatus 1.

The beam sweeping unit 2061 can perform beam sweeping within a predetermined time period. The terminal apparatus 2 can acquire the information indicating the length of the predetermined time period and the start time from the base station apparatus 1. The number of beam patterns that the beam sweeping unit 2061 can perform beam sweeping within the predetermined time section may be configured based on the frame configuration indicated by the information indicating the frame configuration notified from the base station apparatus 1.

In a case that the frame configuration configured for the terminal apparatus 2 is a predetermined frame configuration, the base station apparatus 1 can perform a beam detection operation on the antenna directivity pattern configured by the antenna 206 of the terminal apparatus 2. The beam detecting operation includes an operation in which the base station apparatus 1 transmits a reference signal with a predetermined radio resource to the terminal apparatus 2 and an operation in which the terminal apparatus 2 transmits different antenna directivity patterns, and notifying the terminal apparatus 2 of the reception quality of the signal transmitted by the terminal apparatus 2.

The base station apparatus 1 can notify the terminal apparatus 2 of information indicating a predetermined frame configuration in which the base station apparatus 1 performs beam detection operation. The base station apparatus 1 can signal the predetermined frame configuration in the physical layer and can also notify by the higher layer signaling such as RRC signaling.

The base station apparatus 1 can perform beam detection for each of a plurality of frame configurations configured in the terminal apparatus 2.

According to the above-described method, the base station apparatus 1 and the terminal apparatus 2, which are likely to have a plurality of frame configurations, can appropriately configure the antenna directivity patterns of the antennas to each other, as a result, it is possible to greatly improve the communication quality.

2. Common in all Embodiments

It should be noted that the base station apparatus and the terminal apparatus according to the present invention are not limited to the license band and can be used for radio access technology (RAT) operated in an unlicensed band. Also, the RAT operated in the unlicensed band can be licensed auxiliary access that can receive assistance from the license band.

In addition, the base station apparatus and the terminal apparatus according to the present invention can be used in dual connectivity (DC) in which signals are transmitted (or received) from a plurality of transmission points (or a plurality of reception points). The base station apparatus and the terminal apparatus can be used for communication with at least one of a plurality of transmission points (or reception points) connected by DC. Further, the base station apparatus and the terminal apparatus according to the present invention can be used in carrier aggregation (CA) in which a plurality of component carriers (CC) are used. The base station apparatus and the terminal apparatus, out of the plurality of CCs to be CA'd, they can be either used only for the primary cell, only for the secondary cell, or for both the primary cell and the secondary cell.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that a program for realizing the functions of the embodiments according to the present invention may be recorded in a computer readable recording medium. In that case, this configuration may be realized by recording a program for realizing such control functions on a computer-readable recording medium and causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. Although the general-purpose processor may be a microprocessor, the processor may be a processor of known type, a controller, a micro-controller, or a state machine instead. The general-purpose processor or the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The present international application claims priority based on JP 2016-133249 filed on Jul. 5, 2016, and all the contents of JP 2016-133249 are incorporated in the present international application by reference.

REFERENCE SIGNS LIST 1A, 1B Base station apparatus
2A, 2B Terminal apparatus
101 Higher layer processing unit
1011 Radio resource control unit
1012 Scheduling unit
102 Controller
103 Transmitter
1031 Coding unit
1032 Modulation unit
1033, 2033 Frame configuration unit
1034 Multiplexing unit
1035 Radio transmission unit
104 Receiver
1041 Radio reception unit
1042 Demultiplexing unit
1043 Demodulation unit
1044 Decoding unit
105 Antenna unit
1051 Orthogonal modulation unit
1052 Distribution unit
1053, 1053-1 to N transmission variable phase shifter
1054, 1054-1 to N amplifier
1055, 1055-1 to N transmission antenna elements
1056, 1056-1 to N reception antenna elements
1057, 1057-1 to N low noise amplifier
1058, 1058-1 to N reception variable phase shifter
1059 Composite part
1050 Orthogonal detection unit
1061, 2061 beam sweeping unit
201 Higher layer processing unit
202 Controller
203 Transmitter
204 Receiver
205 Channel state information generating unit
105 Antenna unit
2011 Radio resource control unit
2012 Scheduling information interpretation unit
2031 Coding unit
2032 Modulation unit
2034 Multiplexing unit
2035 Radio transmission unit
2041 Radio reception unit
2042 Demultiplexing unit
2043 Signal detection unit
2044 Frame Interpretation Unit
4000 to 4007 Resources
5000 Subframe

The invention claimed is:

1. A terminal apparatus configured to communicate with a base station apparatus, the terminal apparatus comprising:
   frame configuration circuitry configured to organize a frame supporting a predetermined quantity of subcarriers, the predetermined quantity of subcarriers being included in each of first orthogonal frequency domain multiplexing (OFDM) symbol for a first plurality of resources and a second OFDM symbol for a second plurality of resources;
   transmission circuitry configured to transmit a sounding reference signal (SRS) on the first plurality of resources; and
   higher layer processing circuitry configured to receive higher layer information indicating a first predetermined subcarrier spacing between subcarriers of the predetermined quantity of subcarriers, the first predetermined subcarrier spacing between the subcarriers of the predetermined quantity of subcarriers being set as an initial value within the frame, wherein
   in a case that the transmission circuitry transmits the SRS on the first plurality of resources within the frame periodically, does not transmit the SRS on the second plurality of resources, and the first predetermined subcarrier spacing between the subcarriers of the predetermined quantity of subcarriers included in each of the first OFDM symbol and the second OFDM symbol is changed from the initial value to a second predetermined subcarrier spacing based on the higher layer information, a quantity of times within the frame in which the SRS is transmitted on the first plurality of resources is also changed according to the change in the first predetermined subcarrier spacing.

2. The terminal apparatus according to claim 1, further comprising:
   reception circuitry configured to receive information indicating the first plurality of resources on which the SRS is transmitted.

3. The terminal apparatus according to claim 1, wherein:
   the first predetermined subcarrier spacing between the subcarriers of the predetermined quantity of subcarriers is changed from the initial value to an integer multiple or an integer divisor of the initial value.

4. A base station apparatus configured to communicate with a terminal apparatus, the base station apparatus comprising:
   frame configuration circuitry configured to organize a frame supporting a predetermined quantity of subcarriers, the predetermined quantity of subcarriers being included in each of first orthogonal frequency domain multiplexing (OFDM) symbol for a first plurality of resources and a second OFDM symbol for a second plurality of resources;
   reception circuitry configured to receive a sounding reference signal (SRS) on the first plurality of resources; and
   higher layer processing circuitry configured to transmit higher layer information indicating a first predetermined subcarrier spacing between subcarriers of the predetermined quantity of subcarriers, the first predetermined subcarrier spacing between the subcarriers of the predetermined quantity of subcarriers being set as an initial value within the frame, wherein
   in a case that the reception circuitry receives the SRS on the first plurality of resources within the frame periodically, does not receive the SRS on the second plurality of resources, and the first predetermined subcarrier spacing between the subcarriers of the predetermined quantity of subcarriers included in each of the first OFDM symbol and the second OFDM symbol is changed from the initial value to a second predetermined subcarrier spacing based on the higher layer information, a quantity of times within the frame in which the SRS is transmitted on the first plurality of resources is also changed according to the change in the first predetermined subcarrier spacing.

5. The base station apparatus according to claim 4, further comprising:
    transmission circuitry configured to transmit information indicating the first plurality of resources on which the SRS is transmitted.

6. The base station apparatus according to claim 4, wherein:
    the first predetermined subcarrier spacing between the subcarriers of the predetermined quantity of subcarriers is changed from the initial value to an integer multiple or an integer divisor of the initial value.

7. A communication method for a terminal apparatus configured to communicate with a base station apparatus, the communication method comprising:
    organizing a frame supporting a predetermined quantity of subcarriers, the predetermined quantity of subcarriers being included in each of first orthogonal frequency domain multiplexing (OFDM) symbol for a first plurality of resources and a second OFDM symbol for a second plurality of resources;
    transmitting a sounding reference signal (SRS) on the first plurality of resources; and
    receiving higher layer information indicating a first predetermined subcarrier spacing between subcarriers of the predetermined quantity of subcarriers, the first predetermined subcarrier spacing between the subcarriers of the predetermined quantity of subcarriers being set as an initial value within the frame, wherein
    in a case that the SRS is periodically transmitted on the first plurality of resources within the frame, the SRS is not transmitted on the second plurality of resources, and the first predetermined subcarrier spacing between the subcarriers of the predetermined quantity of subcarriers is changed from the initial value to a second predetermined subcarrier spacing based on the higher layer information, a quantity of times within the frame in which the SRS is transmitted on the first plurality of resources is also changed according to the change in the first predetermined subcarrier spacing.

8. A communication method for a base station apparatus configured to communicate with a terminal apparatus, the communication method comprising:
    organizing a frame supporting a predetermined quantity of subcarriers, the predetermined quantity of subcarriers being included in each of first orthogonal frequency domain multiplexing (OFDM) symbol for a first plurality of resources and in a second OFDM symbol for a second plurality of resources;
    receiving a sounding reference signal (SRS) on the first plurality of resources; and
    transmitting higher layer information indicating a first predetermined subcarrier spacing between subcarriers of the predetermined quantity of subcarriers, the first predetermined subcarrier spacing between the subcarriers of the predetermined quantity of subcarriers being set as an initial value within the frame, wherein
    in a case that the SRS is periodically received on the first plurality of resources within the frame, the SRS is not received on the second plurality of resources, and the first predetermined subcarrier spacing between the subcarriers of the predetermined quantity of subcarriers included in each of the first OFDM symbol and the second OFDM symbol is changed from the initial value to a second predetermined subcarrier spacing based on the higher layer information, a quantity of times within the frame in which the SRS is transmitted on the first plurality of resources is also changed according to the change in the first predetermined subcarrier spacing.

* * * * *